United States Patent
Ballantine et al.

(10) Patent No.: US 9,214,812 B2
(45) Date of Patent: Dec. 15, 2015

(54) B-SIDE FEED FOR CRITICAL POWER APPLICATIONS

(75) Inventors: Arne Ballantine, Palo Alto, CA (US); Ranganathan Gurunathan, Bangalore (IN); Muralidhara Ramakrishna Shyamavadhani, Bangalore (IN); Chad Pearson, Mountain View, CA (US); William Thayer, Los Gatos, CA (US); KR Sridhar, Los Gatos, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 842 days.

(21) Appl. No.: 13/533,496

(22) Filed: Jun. 26, 2012

(65) Prior Publication Data

US 2012/0326504 A1 Dec. 27, 2012

Related U.S. Application Data

(60) Provisional application No. 61/501,382, filed on Jun. 27, 2011.

(51) Int. Cl.
*H02J 1/00* (2006.01)
*H02J 3/06* (2006.01)
*H02J 9/00* (2006.01)
*H02J 3/00* (2006.01)
*H02J 9/06* (2006.01)

(52) U.S. Cl.
CPC . *H02J 3/006* (2013.01); *H02J 9/06* (2013.01); *Y02B 90/14* (2013.01); *Y10T 307/352* (2015.04); *Y10T 307/62* (2015.04); *Y10T 307/696* (2015.04)

(58) Field of Classification Search
CPC ............... H02J 1/00; H02J 3/00; H02J 3/06; H02J 3/006; H02J 9/00; Y10T 307/62; Y10T 307/352; Y10T 307/696; Y02B 90/14
USPC .............................................. 307/24, 65, 80
See application file for complete search history.

(56) References Cited

U.S. PATENT DOCUMENTS

| 5,929,538 A | 7/1999 | O'Sullivan et al. |
| 6,304,006 B1 | 10/2001 | Jungreis |
| 2004/0155527 A1 | 8/2004 | Bryde |
| 2006/0072263 A1 | 4/2006 | Deng et al. |

(Continued)

FOREIGN PATENT DOCUMENTS

| CN | 101348215 A | 1/2009 |
| WO | WO 02/05403 | 1/2002 |

(Continued)

OTHER PUBLICATIONS

Chinese Patent Office Communication for Corresponding Chinese Application No. CN 201280032301.1, dated Jun. 15, 2015 (16 sheets).

(Continued)

*Primary Examiner* — Hal Kaplan
(74) *Attorney, Agent, or Firm* — The Marbury Law Group PLLC

(57) ABSTRACT

A method of providing power to a load, such as an IT load, includes generating an output power using at least one power module comprising at least one fuel cell segment, providing a first portion of the output power through a grid to an A-side power feed of the load, and providing a second portion of the output power to a B-side power feed of the load.

40 Claims, 27 Drawing Sheets

(56) References Cited

U.S. PATENT DOCUMENTS

| | | | |
|---|---|---|---|
| 2008/0165555 A1 | 7/2008 | Deng et al. | |
| 2008/0253052 A1* | 10/2008 | Crewson et al. | 361/98 |
| 2009/0273240 A1 | 11/2009 | Gurunathan et al. | |
| 2011/0133552 A1 | 6/2011 | Binder et al. | |

FOREIGN PATENT DOCUMENTS

| | | |
|---|---|---|
| WO | WO 2004/054065 | 6/2004 |
| WO | WO 2006/094128 | 9/2006 |

OTHER PUBLICATIONS

International Search Report & Written Opinion issued in PCT Application No. PCT/US2012/044214, mailed on Jan. 23, 2013.

International Preliminary Report on Patentability and Written Opinion received in connection with International Application No. PCT/US2012/044214; dtd Jan. 7, 2014.

European Patent Office Communication Contains European Supplemental Search Report for Corresponding European Application No. 12 80 4200, dated Mar. 27, 2015 (6 sheets).

European Patent Office Communication Contains Supplemental European Search Report for Corresponding European Application No. EP 12 80 4200, dated Mar. 18, 2015 (6 sheets).

European Patent Office Communication Pursuant to Rules 70(2) and 70a(2) for Corresponding European Application No. EP 12 80 4200, dated Apr. 15, 2015 (1 sheet).

* cited by examiner

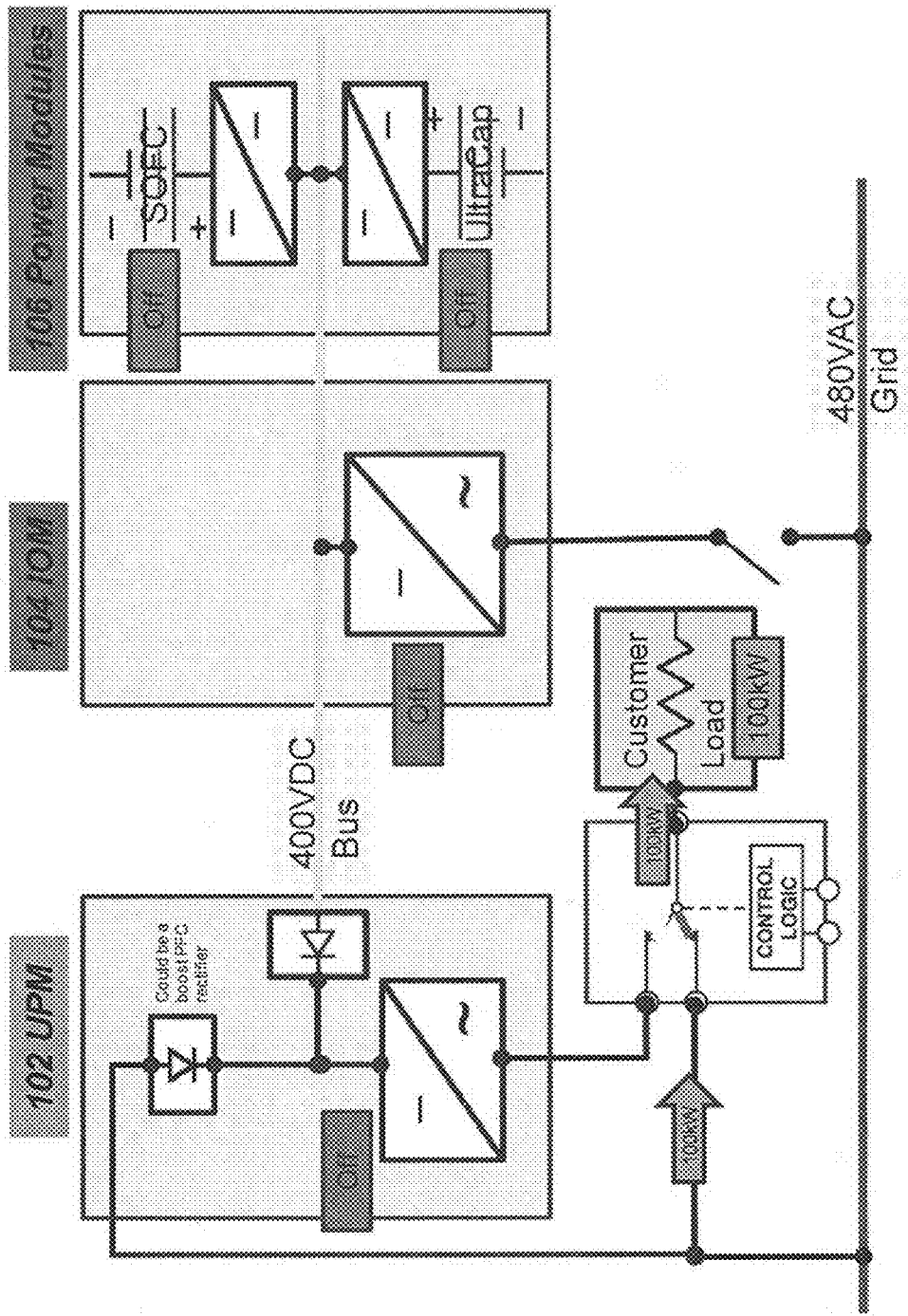
FIG. 1B - Installation / Load From Grid

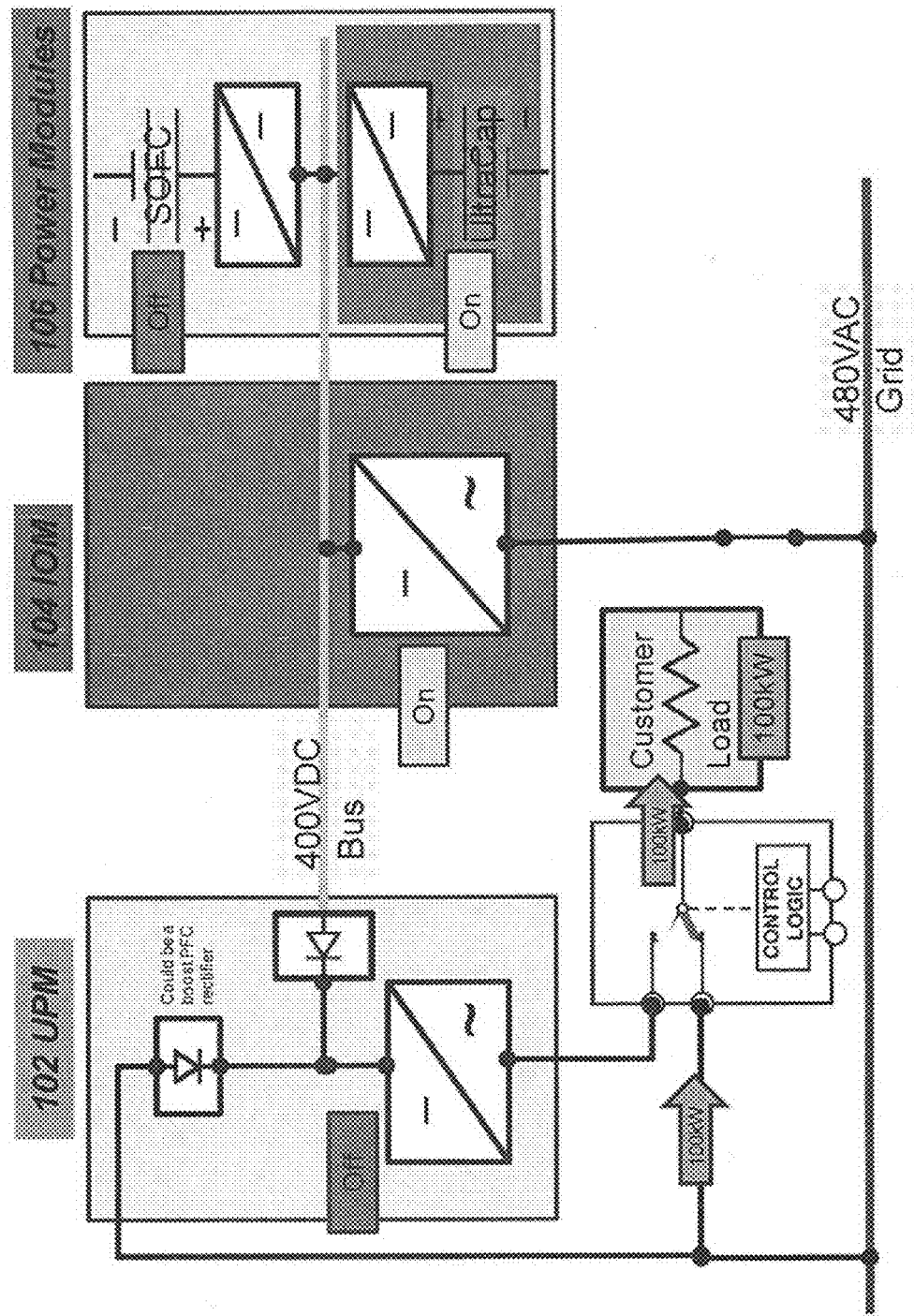
FIG. 1C - IOM Start-up / Charge Ultracap

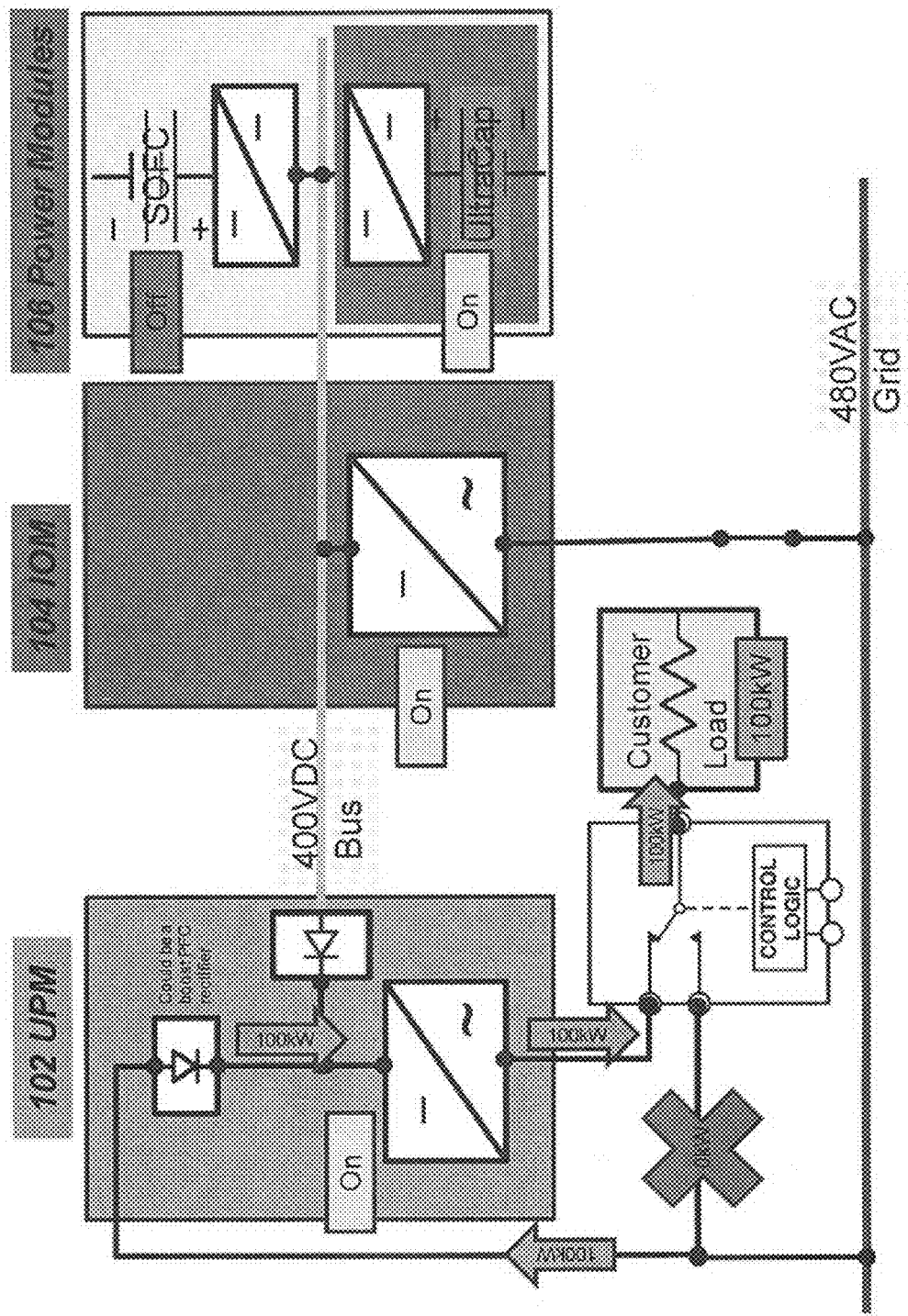

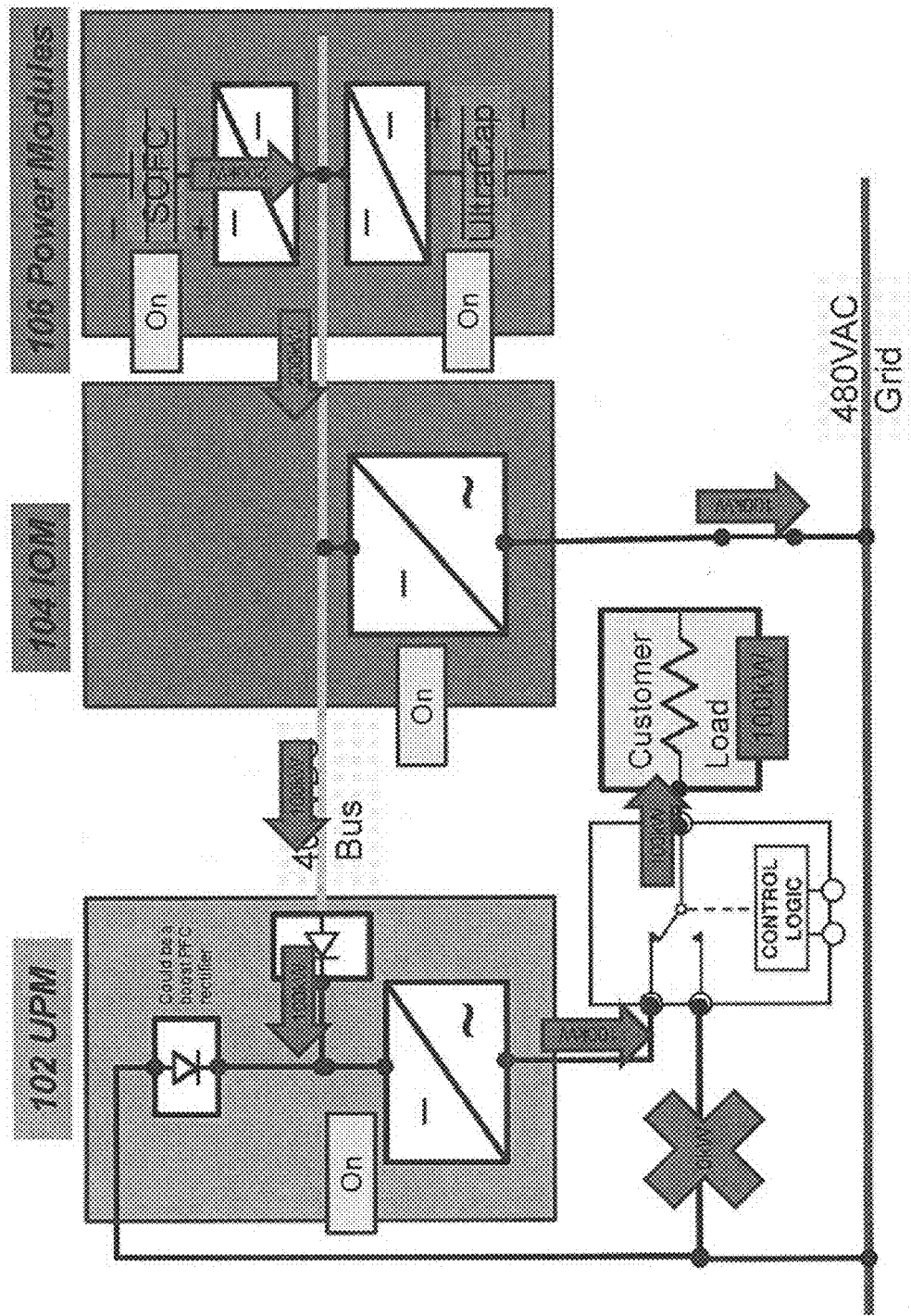
FIG. 1E - SOFC On / Normal Operation

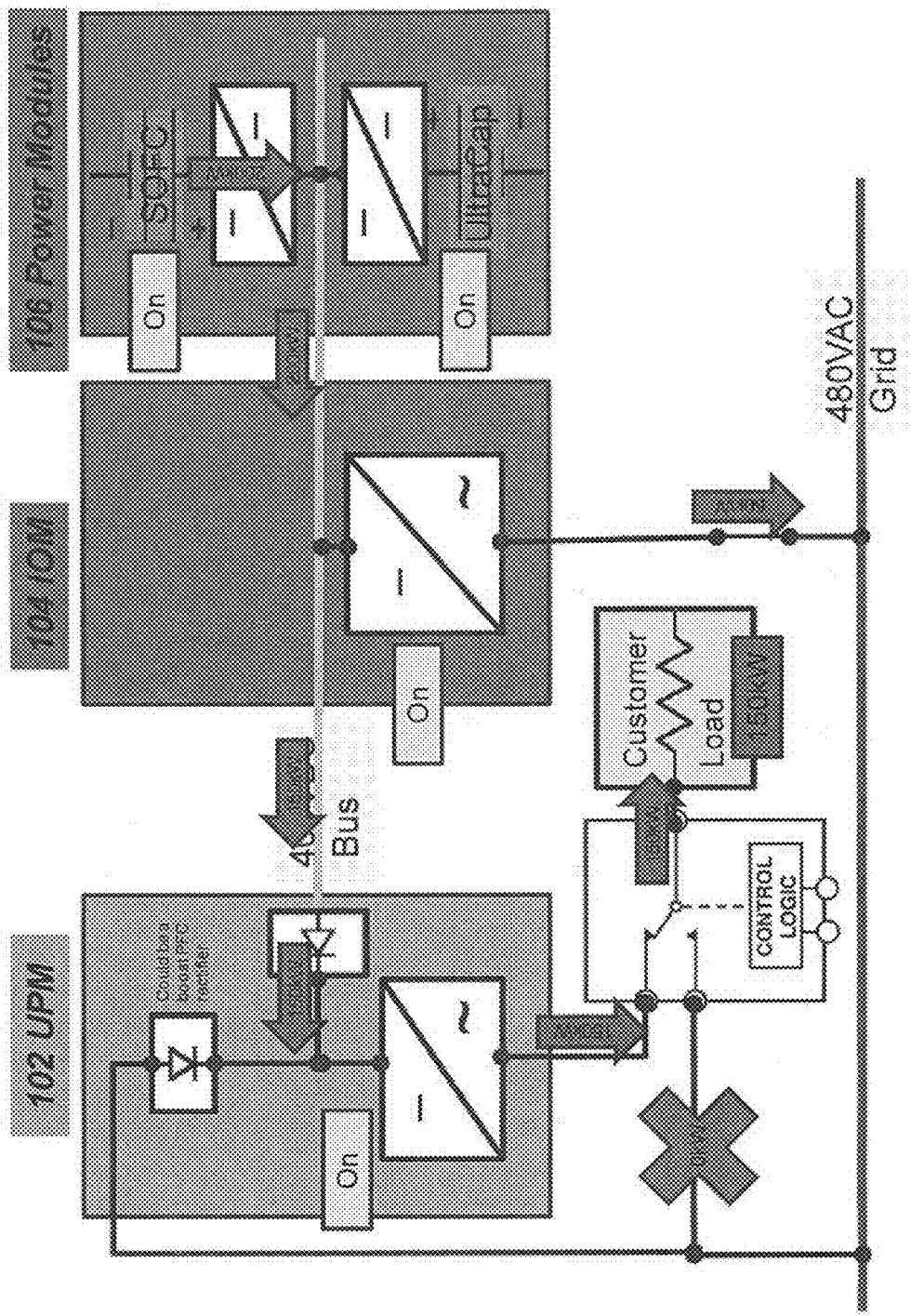

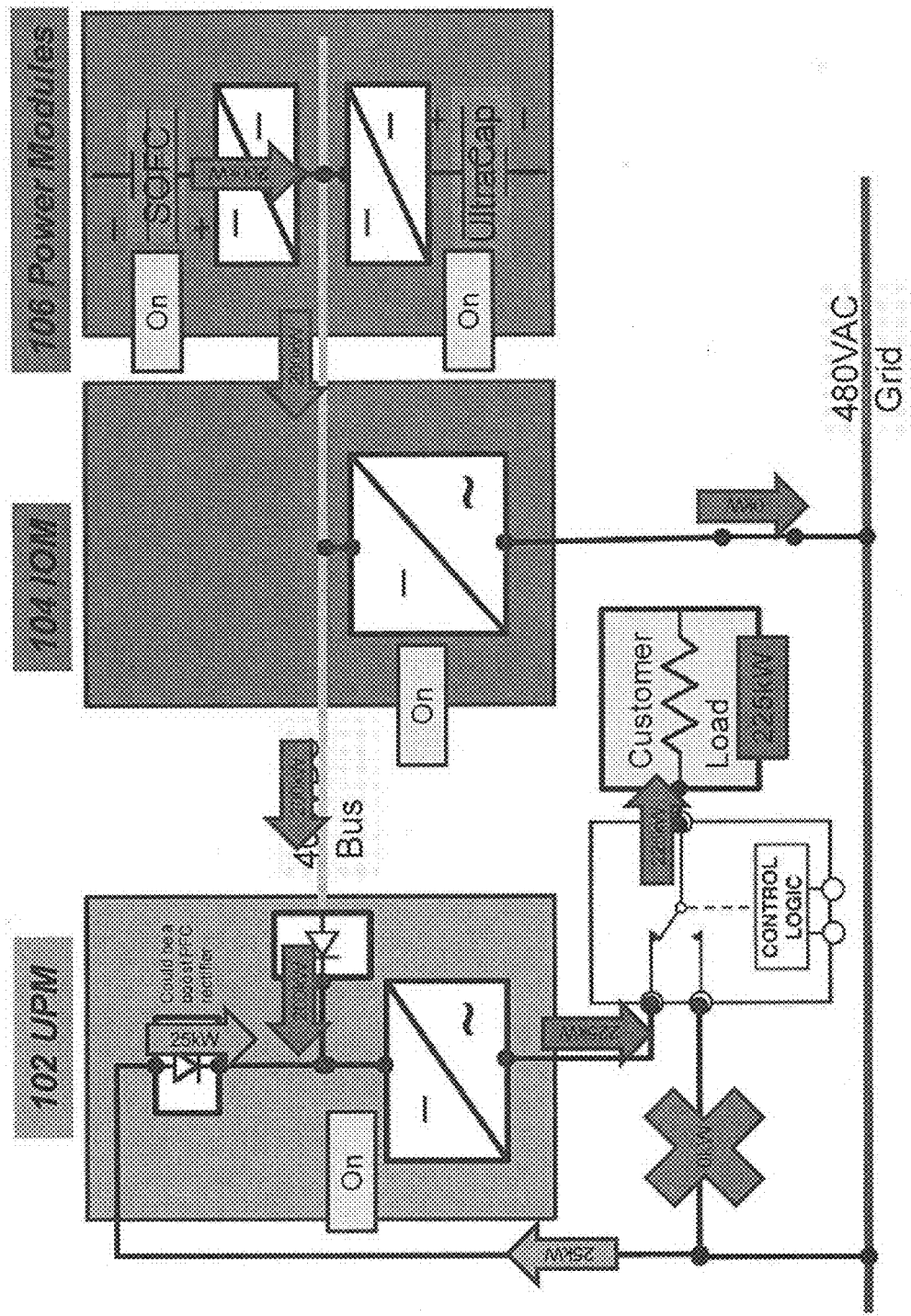
FIG. 1G - Customer Load Spike

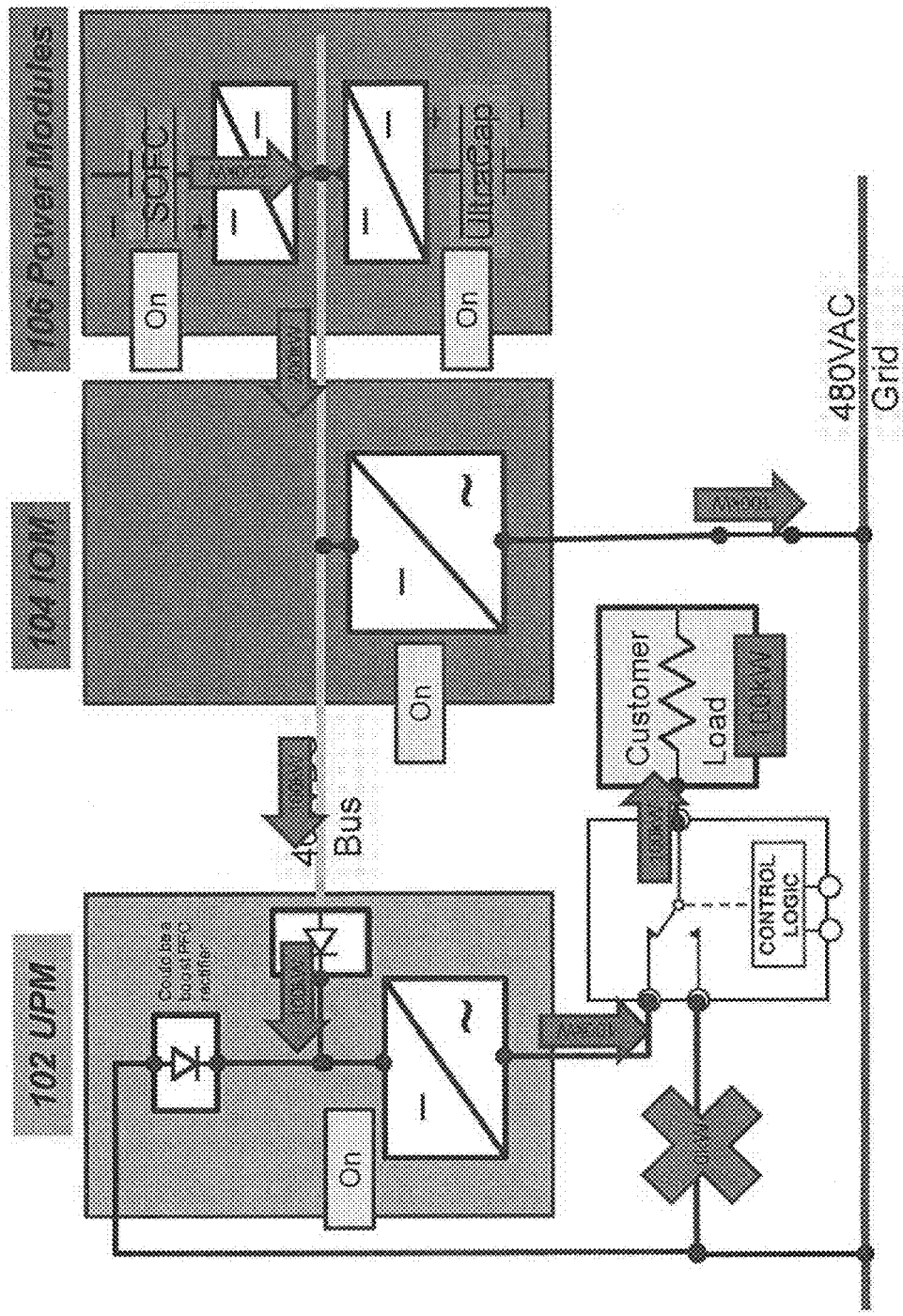

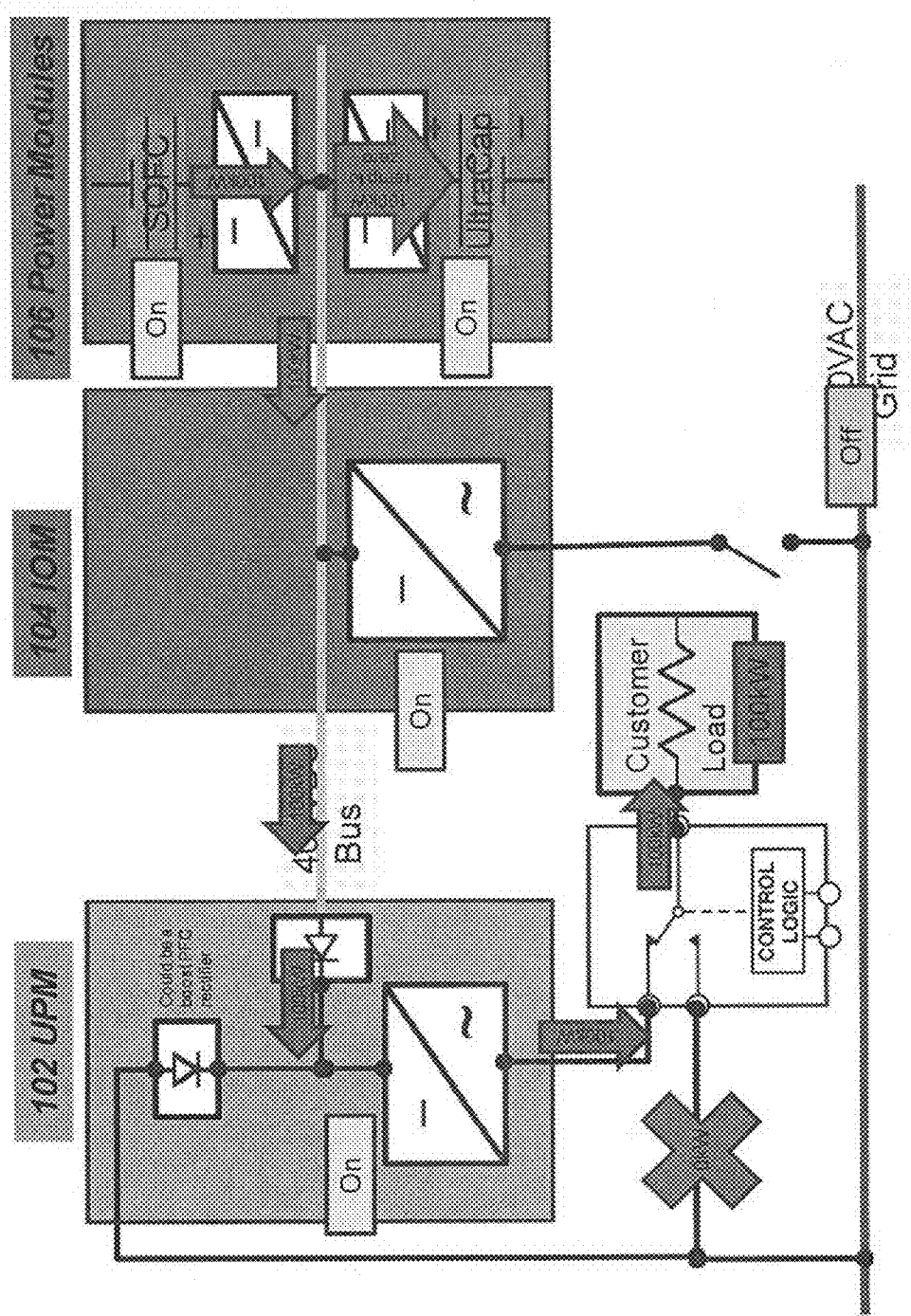
FIG. 11 - Loss of Grid / Ultracap Softens "Step"

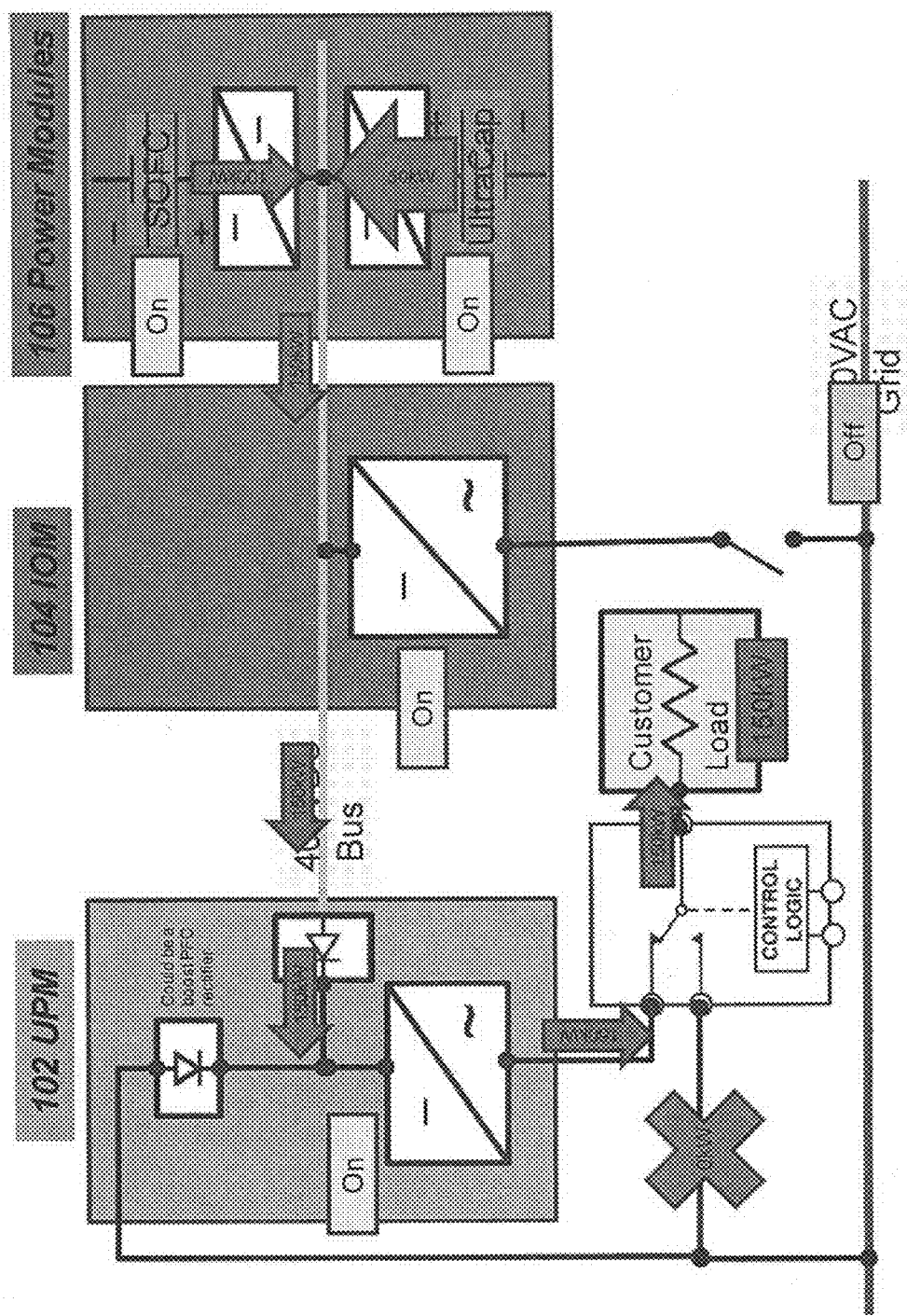

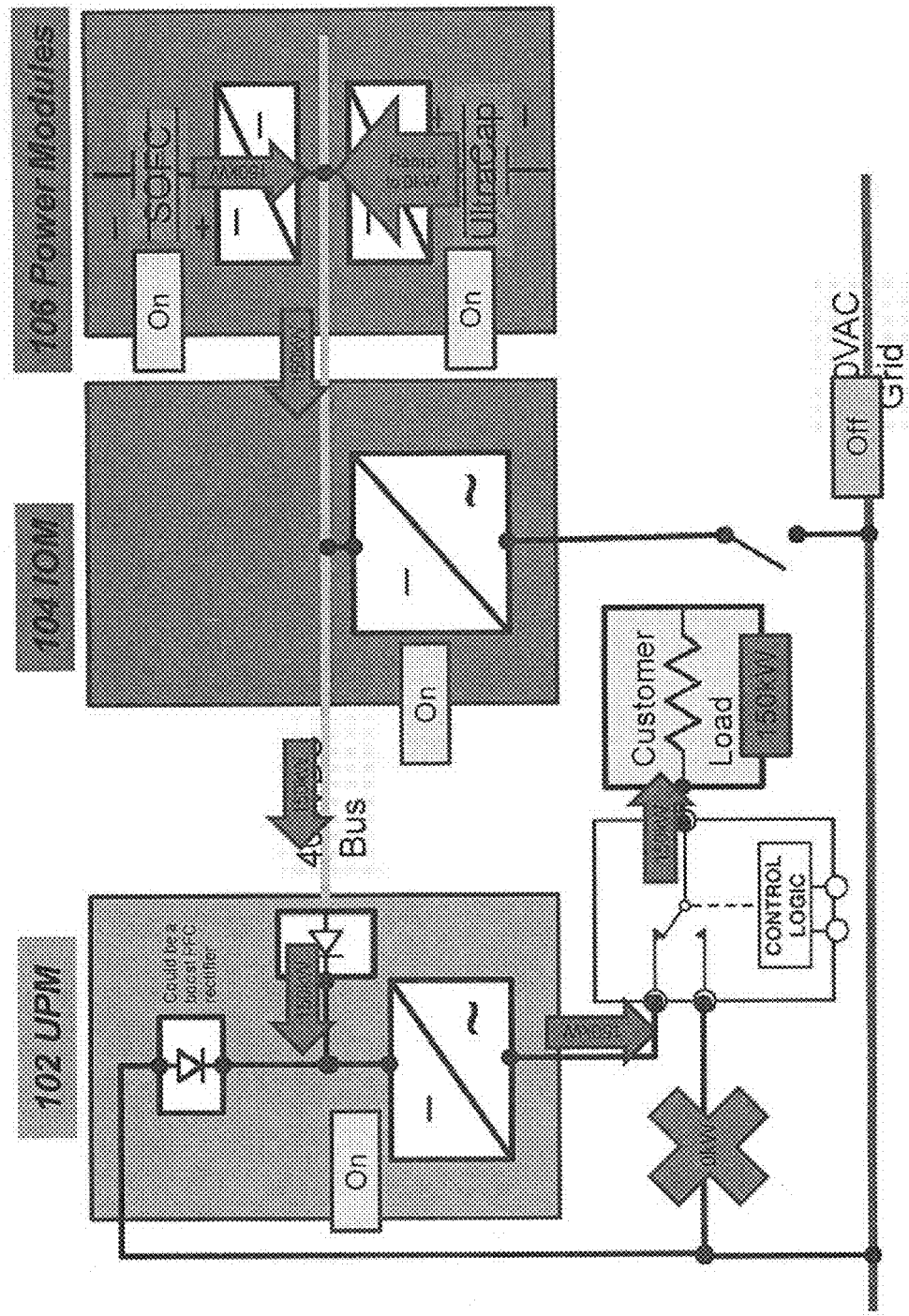
FIG. 1K - Load Transient w/o Grid (part 2)

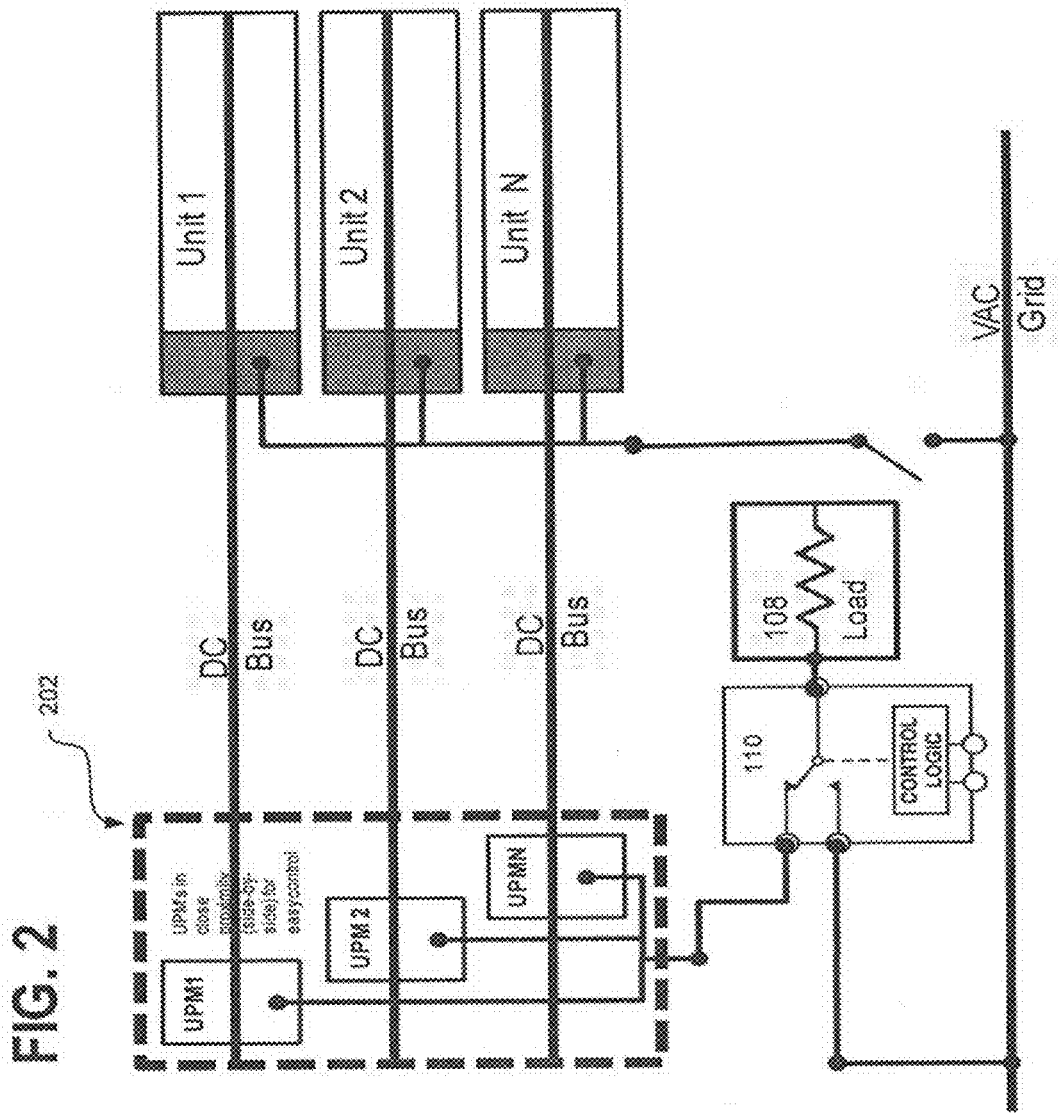

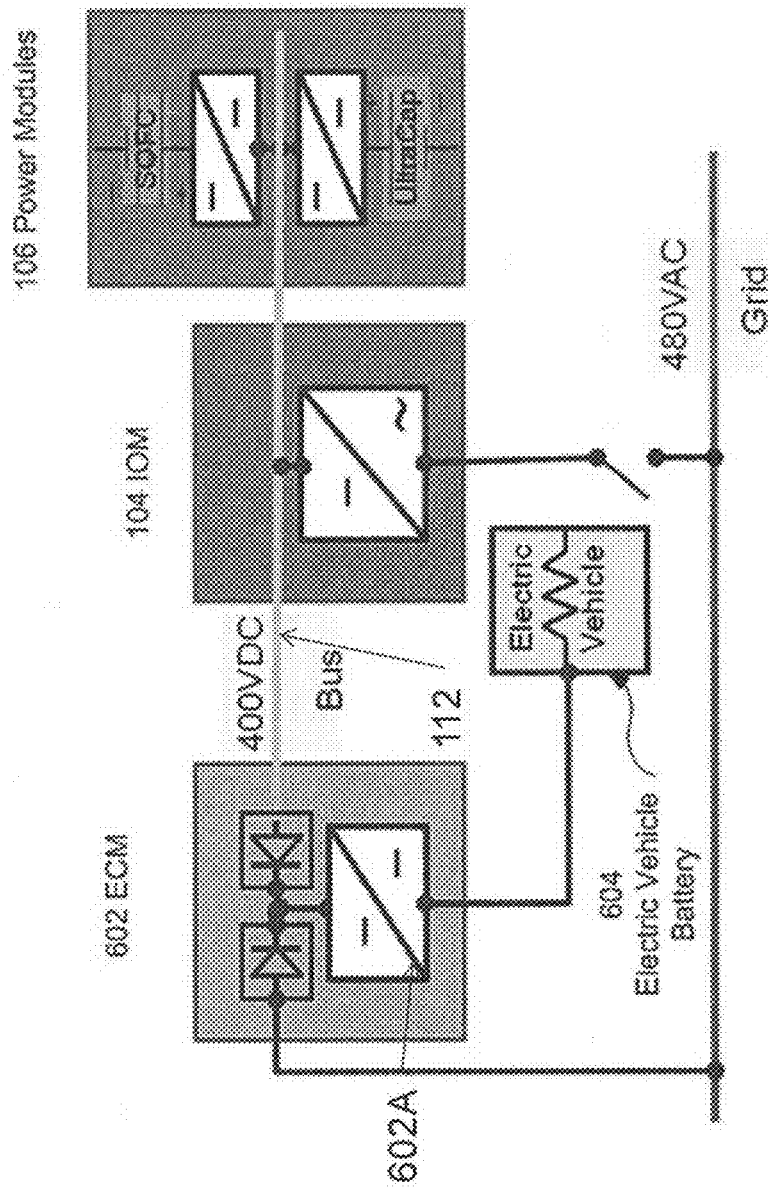

B-SIDE FEED FOR CRITICAL POWER APPLICATIONS

RELATED APPLICATION

This application claims the benefit of priority to U.S. Provisional Application No. 61/501,382, filed on Jun. 27, 2011, the entire contents of which are incorporated herein by reference.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their DC output into an alternating current (AC). As a result, synchronization of alternative power sources is required.

In addition, many alternative power sources use machines such as pumps and blowers which run off auxiliary power. Motors for these pumps and blowers are typically 3-phase AC motors which may require speed control. If the alternative power source generates a direct current (DC), the direct current undergoes several states of power conversion prior to delivery to the motor(s). Alternatively, the power to the motors for pumps, blowers, etc. may be provided using the electrical grid, an inverter, and a variable frequency drive. In such a configuration, two stages of power conversion of the inverter are incurred along with two additional stages of power conversion for driving components of the AC driven variable frequency drive. In general, each power conversion stage that is performed adds cost to the system, adds complexity to the system, and lowers the efficiency of the system.

Operating individual distributed generators such as fuel cell generators both with and without a grid reference and in parallel with each other without a grid reference is problematic in that switch-over from current source to voltage source must be accommodated. Additionally, parallel control of many grid independent generators can be problematic.

To address the mode mode-switch-over issue, a double-inverter arrangement may be utilized. This allows one inverter to be used in grid tie and a second inverter to be used with the stand-alone load. An exemplary double-inverter arrangement with a load dedicated inverter that is located internally in an input/output module of a solid oxide fuel cell (SOFC) system is described in U.S. patent application Ser. No. 12/148,488 (filed May 2, 2008 and entitled "Uninterruptible Fuel Cell System"), the disclosure of which is incorporated herein by reference in its entirety for all purposes.

Another approach is to drop power for 5-10 cycles to switch modes. If a single inverter is used, a time of 5-10 cycles would be required to drop grid tie and establish voltage mode control.

Yet another approach is to use frequency droop to control the amount of power sharing in grid tied export or in load stand alone output control.

SUMMARY

Embodiments include a power generation system, comprising at least one power module comprising at least one fuel cell segment configured to generate an output power, at least one first output module comprising at least one power conditioning component electrically coupled between the at least one power module and a grid, a first bus electrically connecting the grid to an A-side power feed of a load, such that the at least one power module is configured to supply power to the A-side power feed of the load through the at least one first output module, and at least one second output module comprising at least one power conditioning component electrically coupled between the at least one power module and a B-side power feed of the load.

Further embodiments include a power generation system, comprising at least one power module comprising at least one fuel cell segment generating an output power, at least one uninterruptible power module comprising at least one DC/AC inverter and at least one DC/DC converter which is electrically coupled between the at least one power module and a direct DC power feed to a load, a DC input bus electrically connecting the at least one power module and the at least one uninterruptible power module, and a DC output bus electrically connecting the at least one uninterruptible power module and a load. At least a portion of the output power generated by the at least one power module is provided over the DC input bus at a first voltage to the at least one uninterruptible power module, and is provided from the at least one uninterruptable power module over the DC output bus at a second voltage, different than the first voltage, to the load.

Further embodiments include a method of providing power to a load, comprising generating an output power using at least one power module comprising at least one fuel cell segment, providing a first portion of the output power through a grid to an A-side power feed of the load, and providing a second portion of the output power to a B-side power feed of the load.

Still further embodiments include a method of providing power to a load including generating an output power using at least one power module comprising at least one fuel cell segment, providing a first portion of the output power to a grid, providing a second portion of the output power to a DC/DC converter that converts the output power from a first voltage to a second voltage, and providing the output power at the second voltage to the load.

DESCRIPTION OF THE DRAWINGS

FIGS. 1B to 1K illustrate the system of FIG. 1A in various modes of operation.

FIGS. 2 and 3 are block diagrams illustrating a DC microgrid according to an embodiment.

FIGS. 6A-6E illustrate various modes of operation of the system of the type shown in FIG. 1A. to provide power to an electric vehicle (EV) charging station according to embodiments.

DETAILED DESCRIPTION

Figure 1A:
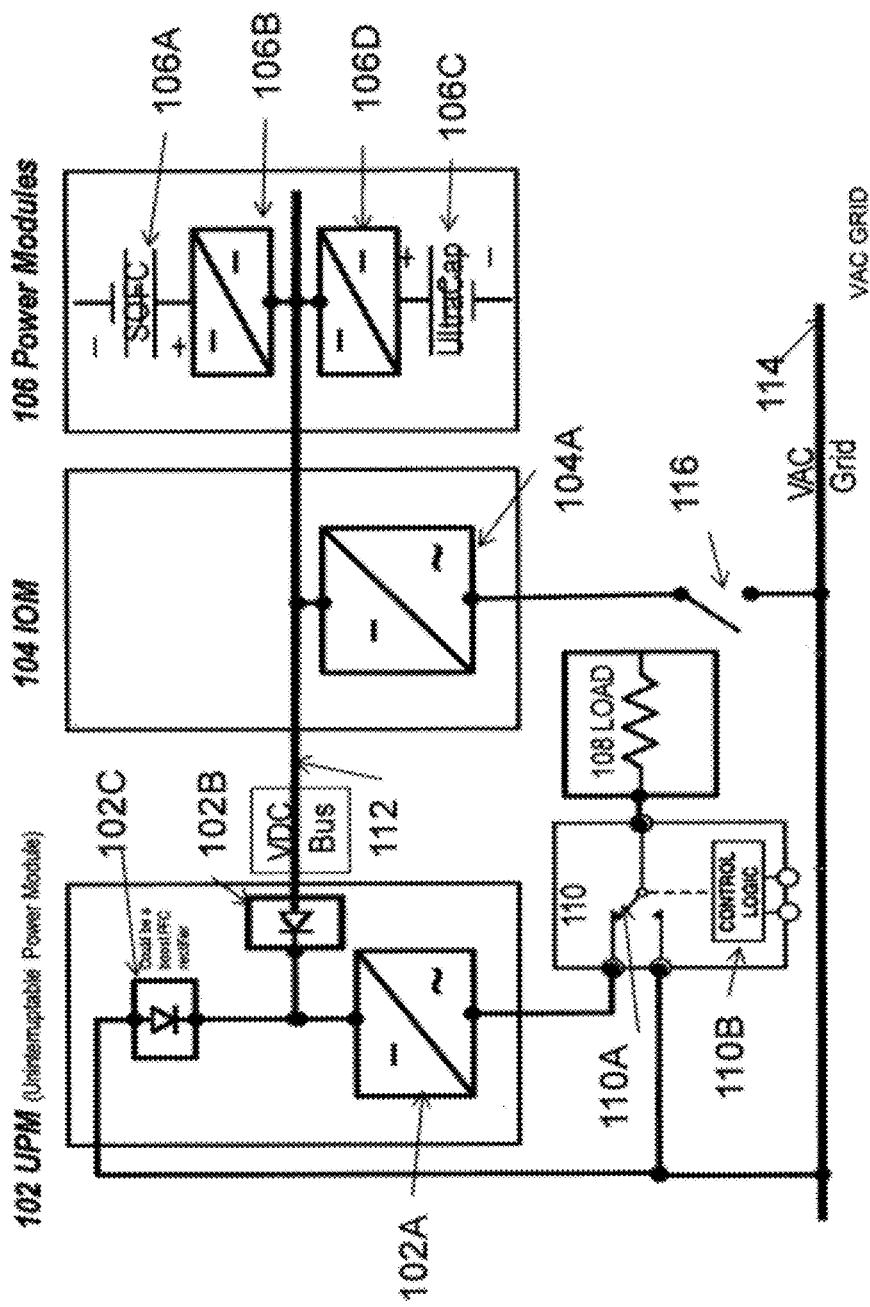
FIG. 1A is a block diagram illustrating a system according to an embodiment.

Referring to FIG. 1, a fuel cell system according to an embodiment includes a uninterruptable power module (UPM) 102, an input/output module (IOM) 104 and one or more power modules 106. If there is more than one power module 106, for example six to ten modules 106, then each power module may comprise its own housing. Each housing may comprise a cabinet or another type of full or partial enclosure, for example the cabinet described in U.S. application Ser. No. 12/458,355, filed on Jul. 8, 2009 and incorporated herein by reference in its entirety. The modules may be arranged in one or more rows or in other configurations.

The UPM 102 includes at least one DC/AC inverter 102A. If desired, an array of inverters may be used. Any suitable inverter known in the art may be used. The UPM 102 optionally contains an input rectifier, such as an input diode 102B which connects to the output of a DC bus 112 from the power module(s) 106 and to the input of the at least one inverter 102A. The UPM also optionally contains a boost PFC rectifier 102C which connects to the output of the electric grid 114, such as a utility grid, and to the input of the at least one inverter 102A.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to the DC bus, 112 such as a split DC bus, by one or more DC/DC converters 106B located in module 106. The DC/DC converters 106B may be located in the IOM 104 instead of the power module 106.

The power module(s) 106 may also optionally include an energy storage device 106C, such as a bank of supercapacitors or batteries. Device 106C may also be connected to the DC bus 112 using one or more DC/DC converters 106D.

The UPM 102 is connected to an input/output module (IOM) 104 via the DC bus 112. The DC bus receives power from power modules 106.

The fuel cell system and the grid 114 are electrically connected to a load 108 using a control logic unit 110. The load may comprise any suitable load which uses AC power, such as one or more buildings, appliances, lights, tools, air conditioners, heating units, factory equipment and machinery, power storage units, computers, security systems, etc. The control logic unit includes a switch 110A and control logic 110B, such as a computer, a logic circuit or a dedicated controller device. The switch may be an electrical switch (e.g., a switching circuit) or an electromechanical switch, such as a relay.

Control logic 110B routes power to the load 108 either from the UPM 102 or from the grid 114 using switch 110A. The at least one fuel cell segment 106A and storage device 106C from module 106 are electrically connected in parallel to the at least one first inverter 104A in IOM and to the at least one second inverter 102A in the UPM 102. The at least one first inverter 104A is electrically connected to the load 108 through the electrical grid 114 using switch 110A in the first position. In contrast to the circuit shown in U.S. patent application Ser. No. 12/148,488 (filed May 2, 2008 and entitled "Uninterruptible Fuel Cell System"), the grid 114 in FIG. 1A is directly connected to the load 108 through the control logic unit 110 without passing through a bidirectional inverter. The at least one second inverter 102A is electrically connected to the load 108 with the switch 110A in the second position without using the electrical grid 114 (i.e., the output of the fuel cell segment 106A does not have to pass through the grid 114 to reach the load 108).

Thus, the control logic 110B selects whether to provide power to the load from the electrical grid 114 (or from the fuel cell segment 106A through the grid) or through the at least one second inverter 102A. The control logic 110B may determine a state of the power modules and select a source to power the load 108 based on the state of the power modules, as described below.

A second switch 116 controls the electrical connection between the IOM 104 and the grid 114. Switch 116 may controlled by the control logic 110B or by another system controller.

By way of illustration and not by way of limitation, the system contains the following electrical paths:

A path to the load 108 from the AC grid 114.

A path from the AC grid 114 through the IOM 104 to storage elements 106C of power modules 106 (for example, supercapacitors or batteries).

A path from the storage elements 106C of the power modules 106, over the DC bus 112 to the IOM 104 and the UPM 102 in parallel. The DC bus delivers DC to the inverter in the UPM 102. The inverter 102A in the UPM 102 or inverter 104A in IOM 104 delivers AC power to the load 108 depending on the position of the switch 110A.

A path from the power modules 106 (which may include power from the fuel cell segment(s) 106A and/or the storage elements 106C of the power modules 106), over the DC bus 112 to the IOM 104 and the UPM 102. The DC bus delivers DC voltage to the inverter in the UPM 102. The inverter 102A in the UPM 102 delivers AC power to the load 108. Power in excess of that required by the load 108 is delivered to the AC grid through an inverter 104A in the IOM 104. The amount of power that is delivered to the AC grid 114 will vary according the demands of the load 108. If the amount of power required by the load 108 exceeds the power provided by the power modules 106, the additional power demand may be supplied by the AC grid 114 directly to the load 108 through switch 110A in the first position or to the UPM 102 with the switch 110A in the second position. The grid power is rectified in rectifier 102C in UPM 102 and provided to the inverter 102A in the UPM 102 and converted back to AC for powering the load 108.

FIGS. 1B-1K illustrate various modes of operation of the system shown in FIG. 1A. While the embodiments described below illustrate a load 108 which requires 100 kW of power and the fuel cell segment(s) 106A which output 200 kW of power in steady state, these values are provided for illustration only and any other suitable load and power output values may be used.

FIG. 1B illustrates the system operation during the installation of the system and/or during a period when the load 108 receives power from the grid 114. As shown in this figure, the fuel cell segment(s) 106A and the energy storage device 106C are in the OFF state, the IOM 104 inverter 104A and the UPM inverter 102A are both in the OFF state and the second switch 116 is open such that there is no electrical communication between the IOM and the grid. The control logic switch 110A is in the first position to provide power from the grid 114 to the load 108 through the control logic module 110. As shown in the figure, 100 kW of power is provided from the grid to the load through the control logic module.

FIG. 1C illustrates the system operation during IOM start-up and charging of the energy storage device (e.g., bank of supercapacitors) 106C from the grid 114 while the load 108 receives power from the grid 114. As shown in this figure, the fuel cell segment(s) 106A are in the OFF state while the energy storage device 106C is in the ON state. The IOM 104 bi-directional inverter 104A is in the ON state and the UPM inverter 102A is in the OFF state. The second switch 116 is closed such that there is electrical communication between the IOM and the grid to provide power from the grid 114 to the energy storage device 106C through the IOM 104 inverter 104A and the DC bus 112. The control logic switch 110A is in the first position to provide power from the grid 114 to the load 108 through the control logic module 110. As shown in the figure, 100 kW of power is provided from the grid to the load through the control logic module.

FIG. 1D illustrates the system operation during UPM start-up following IOM start-up. UPM functions by receiving power from the energy storage device 106C. UPM provides the power from the energy storage device 106C to the load 108. As shown in this figure, the fuel cell segment(s) 106A are in the OFF state while and the energy storage device 106C is in the ON state. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the UPM 102 to the load 108 through the control logic module 110. As shown in the figure, 100 kW of power is provided from the grid 114 to the load 108 through the rectifier 102C and inverter 102A of the UPM 102 and then through the control logic module. Some power may also be provided to the load 108 from the energy storage device 106C via the DC bus 112, UPM 102 and control logic module.

FIG. 1E illustrates the steady state operation of the system. In this mode the fuel cell segment(s) 106A is in the ON state to power the load 108. The segment(s) 106A may provide 200 kW of power in a steady state mode (this may be the designed power output or a maximum power output). As shown in this figure, the energy storage device 106C is in the ON state to act as an emergency backup power source. The IOM 104 bi-directional inverter 104A is in the ON state and the UPM inverter 102A is in the ON state. The 200 kW power output is split between the grid 114 and the load 108. The second switch 116 is closed such that there is electrical communication between the IOM and the grid to provide 100 kW of power from the fuel cell segment(s) 106A to the grid. The control logic switch 110A is in the second position to provide the other 100 kW of power from the fuel cell segment(s) 106A in the power module 106 through the DC bus passing through IOM 104 and through the inverter 102A of the UPM 102 and then through the control logic module 110 to the load 108. Preferably, this 100 kW of power does not pass through the IOM inverter 104A and/or the grid 114 to reach the load 108. While a 200 kW power output split 50/50 between the grid and the load is described above, different power outputs may be used as needed, such as 25 kW to 1000 kW, which may be split 10/90 to 90/10 between the grid and the load.

FIG. 1F illustrates operation of the system during a relatively steady load 108 increase from 100 kW to 150 kW (i.e., when the load requires more power than prior steady state operation). In this mode, more of the power output of the fuel cell segment(s) is provided to the load and less of this power output is provided to the grid than in the steady state mode described above. If desired, 100% of the power output may be provided to the load and 0% to the grid. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid to provide 50 kW of power from the fuel cell segment(s) 106A through the IOM inverter 104A to the grid 114. The control logic switch 110A is in the second position to provide 150 kW of power from the fuel cell segment(s) 106A in the power module 106 through the DC bus passing through IOM 104 and through the inverter 102A of the UPM 102 and then through the control logic module 110 to the load 108. Thus, the power output of the fuel cell segment(s) 106A is preferably split between the grid and the load in this mode. Preferably, the power does not pass through the IOM inverter 104A and/or the grid 114 to reach the load 108.

FIG. 1G illustrates operation of the system during a sudden load 108 spike which requires more power than the fuel cell segment(s) 106A can generate at that time. For example, the load spike is from 100 kW to 225 kW while the segment(s) 106A can only generate 200 kW of power in steady state or in maximum power mode. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. However, no power is provided from fuel cell segment(s) 106A through the IOM inverter 104A to the grid 114 due to the load spike. The control logic switch 110A is in the second position to provide power from the fuel cell segment(s) 106A in the power module 106 and from the grid 114 through the DC bus passing through IOM 104 and through the inverter 102A of the UPM 102 and then through the control logic module 110 to the load 108. In this mode, the power to the load is provided from both the fuel cell segment(s) and the grid. As shown, 200 kW from the segment(s) 106A is provided through the DC bus 112, diode 102B, inverter 102A and switch 110A to the load 108, while 25 kW is provided from the grid 114 through the rectifier 102B, inverter 102A and switch 110A to the load 108 to achieve a total 225 kW of power required by the load. Preferably, the power from the fuel cell segment(s) does not pass through the IOM inverter 104A and/or the grid 114 to reach the load 108.

FIG. 1H illustrates operation of the system during a return to normal or steady state operation after the sudden load 108 spike. The fuel cell segment(s) 106A is in the ON state to power the load 108. As shown in this figure, the energy storage device 106C is in the ON state to act as an emergency backup power source. The IOM 104 bi-directional inverter 104A is in the ON state and the UPM inverter 102A is in the ON state. The second switch 116 is closed such that there is electrical communication between the IOM and the grid. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, the fuel cell segment(s) continue to output steady state or maximum power (e.g., 200 kW) which is split between the load and the grid. As shown, 200 kW from the segment(s) 106A is provided to the IOM 104. IOM 104 provides 100 kW of power from fuel cell segment(s) 106A through the IOM inverter 104A to the grid 114. The DC bus 112 provides the remaining 100 kW of power from IOM 104 through diode 102B, inverter 102A and switch 110A to the load 108. Preferably, the power does not pass through the IOM inverter 104A and/or the grid 114 to reach the load 108.

FIG. 1I illustrates operation of the system during loss of power from the grid 114 (e.g., during a black out). The fuel cell segment(s) 106A is in the ON state to power the load 108. As shown in this figure, the energy storage device 106C is in the ON state to absorb power from the fuel cell segment(s) 106A and to the soften the "step" that occurs during the loss of the grid power. The IOM 104 bi-directional inverter 104A is in the ON state and the UPM inverter 102A is in the ON state. The second switch 116 is opened such that there is no electrical communication between the IOM and the grid. A sensor can sense the loss of grid power and a controller can open the switch 116 in response to the sensed grid outage. The control logic switch 110A is in the second position to provide power from the fuel cell segment(s) 106A in the power module 106 through the DC bus passing through IOM 104 and through the inverter 102A of the UPM 102 and then through the control logic module 110 to the load 108. In this mode, out of the 200 kW total power output from the segment(s) 106A, 100 kW is provided to the DC bus 112 and 100 kW is provided to the energy storage device 106C to soften the step. The DC bus 112 provides the 100 kW of power from IOM 104 through diode 102B, inverter 102A and switch 110A to the load 108. The power output of the segment(s) 106A is then gradually reduced to 100 kW to meet the requirements of the load 108.

FIG. 1J illustrates operation of the system during loss of power from the grid 114 (e.g., during a black out) and in case of a load transient (e.g., increased demand for power from load 108) while the fuel cell segment(s) output a reduced amount of power (e.g., 100 kW) which meets the steady state requirements of the load. The fuel cell segment(s) 106A is in the ON state to power the load 108. As shown in this figure, the energy storage device 106C is in the ON state to provide additional power to the load 108. The IOM 104 bi-directional inverter 104A is in the ON state and the UPM inverter 102A is in the ON state. The second switch 116 is opened such that there is no electrical communication between the IOM and the grid. The control logic switch 110A is in the second position to provide power from the fuel cell segment(s) 106A and the energy storage device 106C in the power module 106 through the DC bus passing through IOM 104 and through the inverter 102A of the UPM 102 and then through the control logic module 110 to the load 108. In this mode, 100 kW from the segment(s) 106A and 50 kW from the energy storage device is provided to the DC bus 112. Thus, the DC bus 112 provides the 150 kW of power from IOM 104 through diode 102B, inverter 102A and switch 110A to the load 108. Preferably, the power does not pass through the IOM inverter 104A and/or the grid 114 to reach the load 108.

FIG. 1K illustrates operation of the system during loss of power from the grid 114 (e.g., during a black out) and in case of a continuing load transient (e.g., continued increased demand for power from load 108). The operation is the same as that shown in FIG. 1J, except that the power output of the energy storage device 106C is ramped down to zero over time and the power output of the fuel cell segment(s) is ramped up to the power needed by the load (e.g., 150 kW) over the same time. Thus, over time, the load receives more and more power from the fuel cell segment(s) 106A and less and less power from the energy storage device 106C until all of the required power is supplied to the load 108 by the fuel cell segment(s). Thus, the energy storage device acts as a bridging power source during the initial load transient and is then phased out during the continuing load transient.

Figure 3:
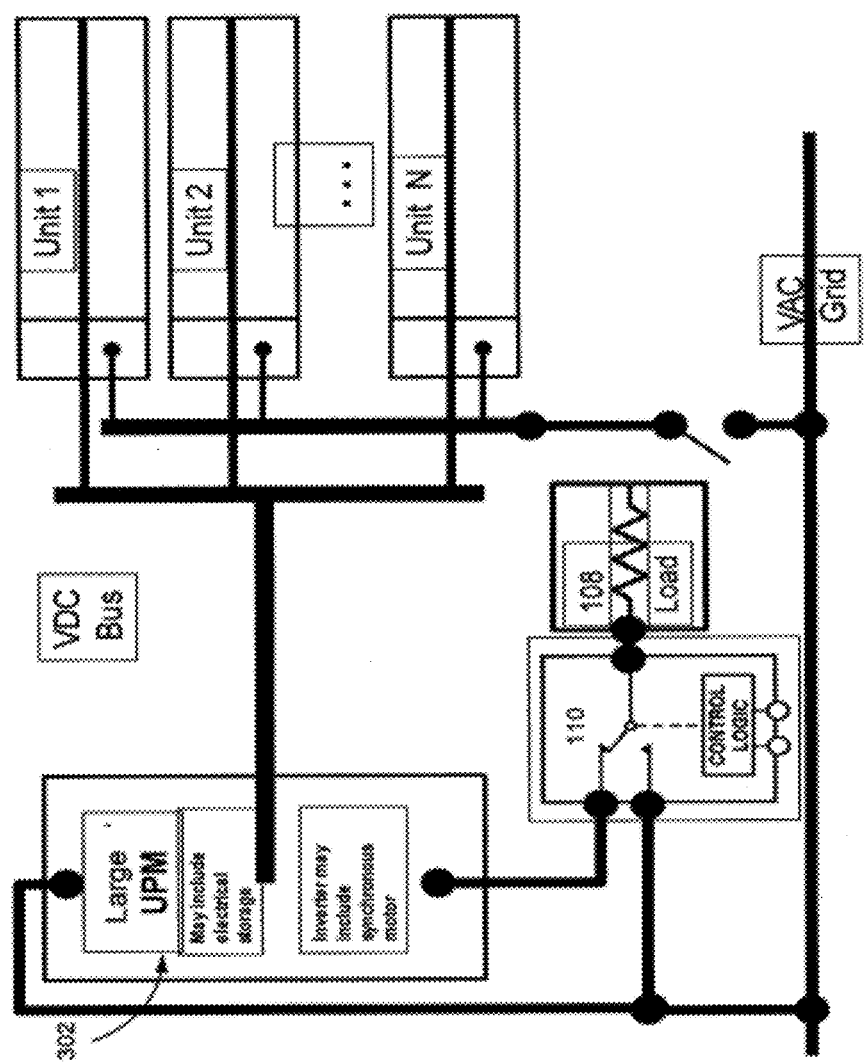

Referring to FIGS. 2 and 3, the output of the DC sources 1 to N are paralleled at the DC-output point, and a DC bus is created. Each DC source 1 to N may comprise one or more power module(s) 106 and an associated IOM 104. The 1 to N sources feed the customer load via a single UPM. Thus, the plurality of power module/IOM pairs share a common UPM. For example, the DC bus may form a DC micro grid connecting any number of DC sources (e.g., SOFC and power conditioning systems) together at one UPM. The UPM 202 may be a large assembly of individual UPM's 102 shown in FIG. 1A capable of output of many multiples of the output of the SOFC systems themselves. As illustrated, in FIG. 2, the UPM 202 comprises "N" UPMs 102 (i.e., one UPM for each DC source), with a separate DC bus connecting each DC power source to a dedicated UPM 102. The N UPM's 102 may be arranged in close proximity (e.g., side by side) in one housing or in separate housings to form the UPM assembly 202.

In an alternative embodiment shown in FIG. 3, the assembly 202 of smaller dedicated UPM's 102 may be replaced by one large UPM 302. In this embodiment, the UPM 302 may include an electrical storage device (e.g., bank of batteries or supercapacitors) and/or a synchronous motor. In general, UPM inverters may include rotating machinery (e.g., a motor, flywheel, etc.) to enhance stored energy content and/or increase reliability and inertia of output.

In summary, the DC sources may comprise fuel cell power modules and an IOM. The inverter within each UPM may be a modular assembly of smaller inverters controlled as one large inverter acting with inputs and/or outputs in parallel. An inverter within the main IOM may be a modular assembly of smaller inverters which are controlled as one large inverter acting with inputs and/or outputs in parallel.

In an embodiment, rectification is provided in the UPM to allow feed from the grid when the stacks are off-line, thus providing the load a protected bus. A boost converter may be used to maintain a good power factor to the grid.

In another embodiment, power from stored energy within an SOFC system or the UPM is used to create a "UPS" unit which has three energy inputs: grid energy; SOFC segment energy; and stored energy (e.g., ultracapacitors or batteries).

In yet another embodiment, a DC micro-grid is connected to other distributed generators such as solar power hardware or wind power hardware.

In an embodiment, the DC micro-grid is connected to DC loads such as the loads of DC data centers or DC vehicle chargers.

In yet another embodiment, when an IOM and UPM are composed of a cluster of inverters acting in parallel, some or all these inverters may be de-energized depending upon customer load conditions. For example, in a 200 kW generation capacity scenario where the customer load is 150 kW, the IOM inverters may be de-energized such that they only support 50 kW instead of a full 200 kW of grid-tied output. Further, in this scenario, it may be that only a portion of the possible inverters in the IOM assembly may be installed into the IOM, thus providing cost savings in terms of equipment required to support the specific customer load scenario.

Figure 4:
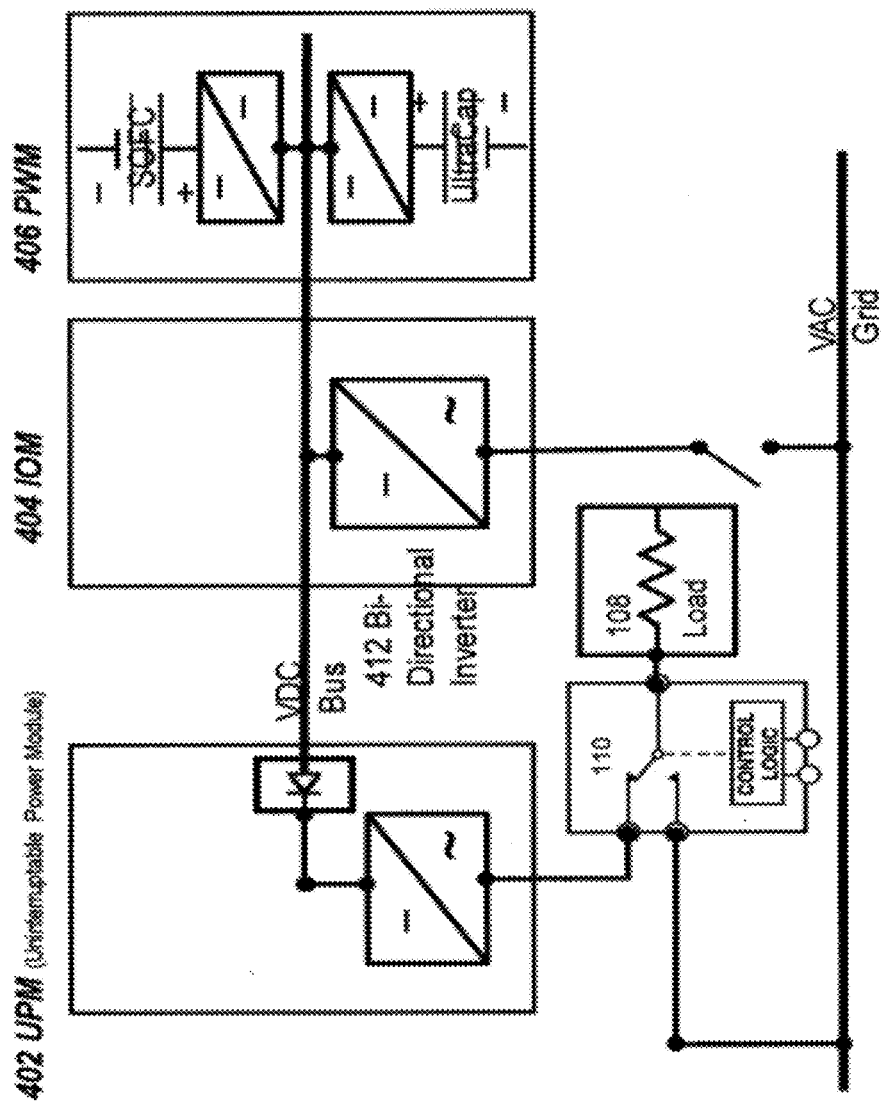
FIG. 4 is a block diagram illustrating an IOM comprising an inverter that is configured for "bi-directional" operation according to an embodiment.

Referring to FIG. 4, in an embodiment, an IOM 404 comprises inverters 412 that are configured for "bi-directional" operation. Such an inverter may have four-quadrant operation. If the grid-tied inverter has "bi-directional" operation, then the rectified feed does not need to be supplied to the UPM 402. Grid power during start-up may come through the grid tied inverter 412 instead of via a rectified input to the UPM 402. This embodiment also provides power from power module(s) 406 for protection of the customer load.

Figure 5:
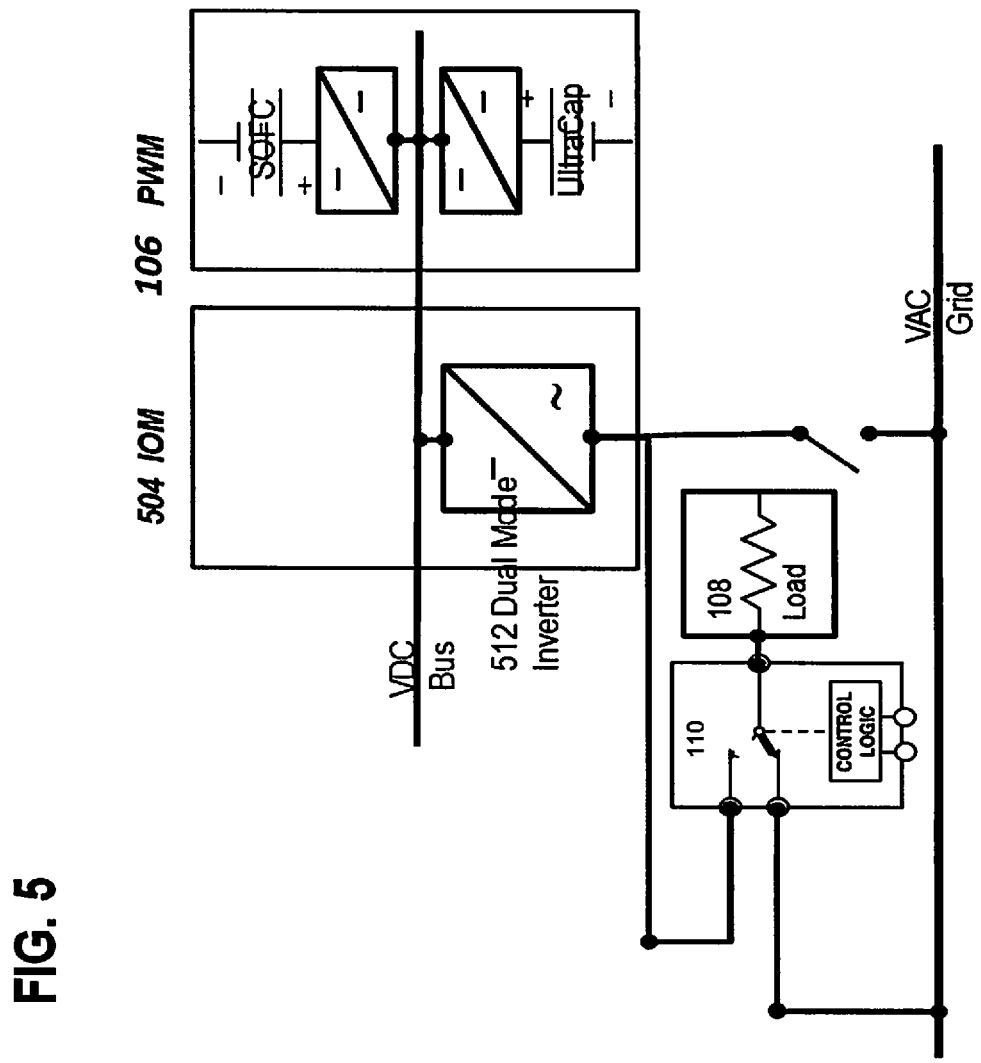
FIG. 5 is a block diagram illustrating an IOM comprising an inverter that is configured for dual mode functionality according to an embodiment.

Referring to FIG. 5, in an embodiment, a UPM is not utilized. In this embodiment, an IOM 504 comprises an inverter 512 that is configured for dual mode functionality. The dual mode inverter 512 is configured to operate with a grid reference and also in a stand-alone mode, supporting a customer load without a grid reference. In this embodiment an output power interruption would be required in order to switch between power generation in one mode and another mode.

FIGS. 6A-6D illustrate various modes of operation of the system shown in FIG. 1A. in which an electric vehicle (EV) charging module (ECM) is used instead of or in addition to the UPM 102. In some modes of operation the ECM may perform the functions of the UPM.

The systems of FIGS. 6A-6D offer several advantages when used in EV charging application. In particular, these systems remove the need for the grid to supply large peaks of power during quick charging of a large number of EVs. The systems can also be used for EV charging in areas where it would be too expensive to provide grid power, and where it would be more cost effective to lay a natural gas pipeline.

Referring to FIG. 6A, an EV charging station comprises one or more power modules 106, an IOM 104 and an ECM 602. ECM contains a DC/DC converter 602A instead of the inverter 102A of UPM 102. In this embodiment, the EV charging station (e.g., ECM 602) has access to grid power. The EV charging station may feed power simultaneously to the grid and the EV battery. A quick (e.g., 10-20 minute) charge may be provided from ECM 602 to the EV battery 604 using power from the power module 106. Whenever an EV battery 604 is connected to the charging station (e.g., ECM 602) for a charge, the power module 106 power is automatically diverted from feeding the grid into the charging station. The diversion of power from the grid to the EV battery 604 may be accomplished by the control logic as illustrated in FIG. 1A and as discussed previously. The grid power may serve as a backup power for the charging station when the power modules 106 are unavailable.

Figure 6B:
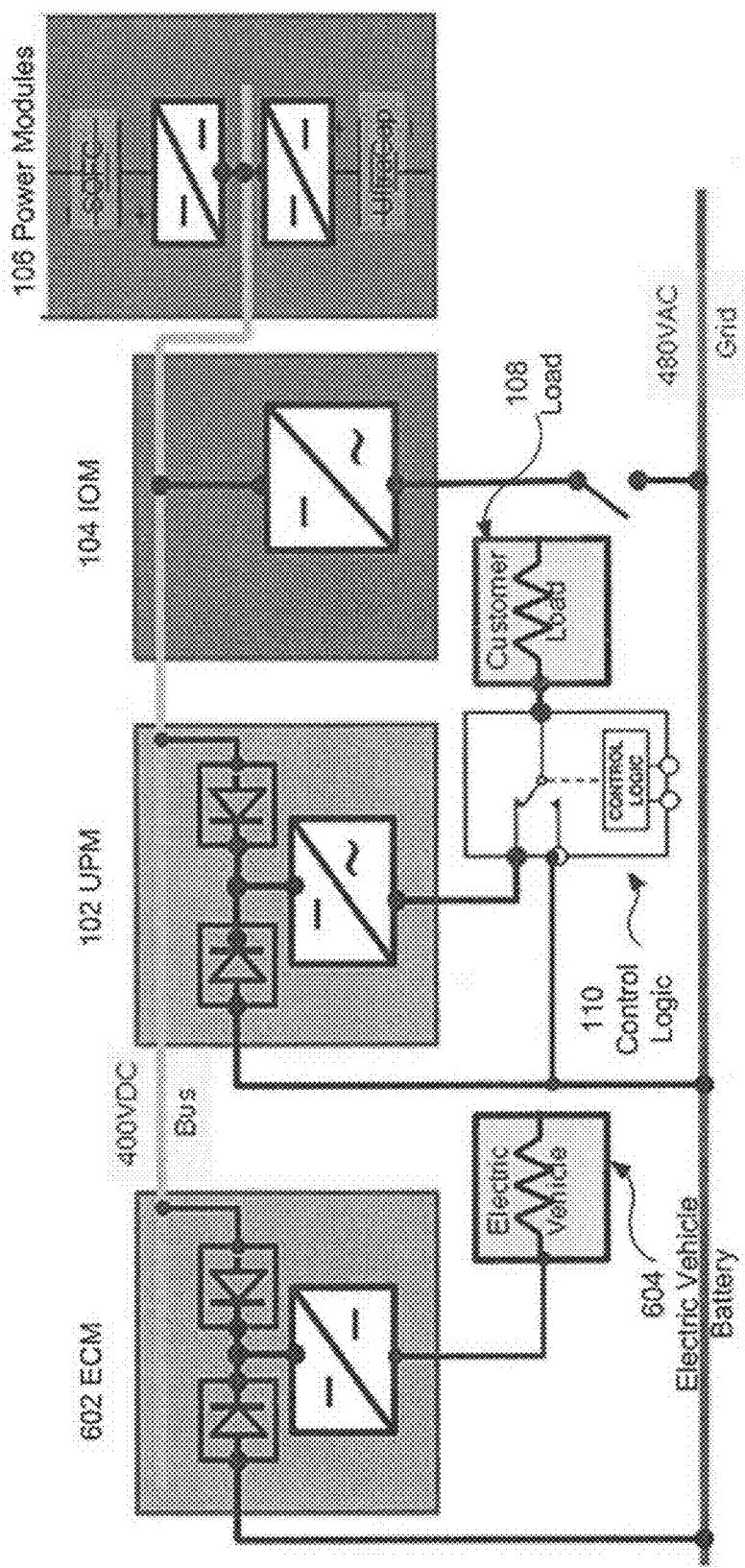

Referring to FIG. 6B, an EV charging station comprises one or more power modules 106, an IOM 104, a UPM 102, control logic unit 110 and an ECM 602. In this embodiment, the EV charging station 602 may also be used to supply a customer load 108 while feeding grid power and charging an EV battery 604. In this configuration, the EV charging station feeds the grid and also provides uninterrupted power to the customer load 108 (such as an office building). The IOM 104 feeds power to the grid, while the UPM 102 supplies power to the customer load 108. The ECM 602 acts as the EV charging station and draws power from the 400V DC bus 112. Thus, the UPM 102 and ECM 602 are connected in parallel to the DC bus 112. While the customer load 108 is supplied without interruption, anytime a vehicle drives in to get charged by the ECM 602, a portion of the power being fed to the grid is diverted to the ECM 602 for the time it takes to charge the EV battery 604. Again, this configuration overcomes the challenge of drawing high peak power from the grid, which is a major issue today especially during day time, when the grid is already supplying full capacity.

A typical application of this configuration would be to supply power to an office building. The load 108 from the building (including data centers, lighting etc) can be supplied clean uninterrupted power from the UPM 102, while power is being fed to the grid. Charging stations can be installed at the car park of this building for the employees and visitors of the company. EV batteries 604 can be charged, and then parked at the car park. Options for both quick charging (1C) and trickle charging (0.1C) can be provided at the charging stations, based on the time constraints of the car owner.

Figure 6C:
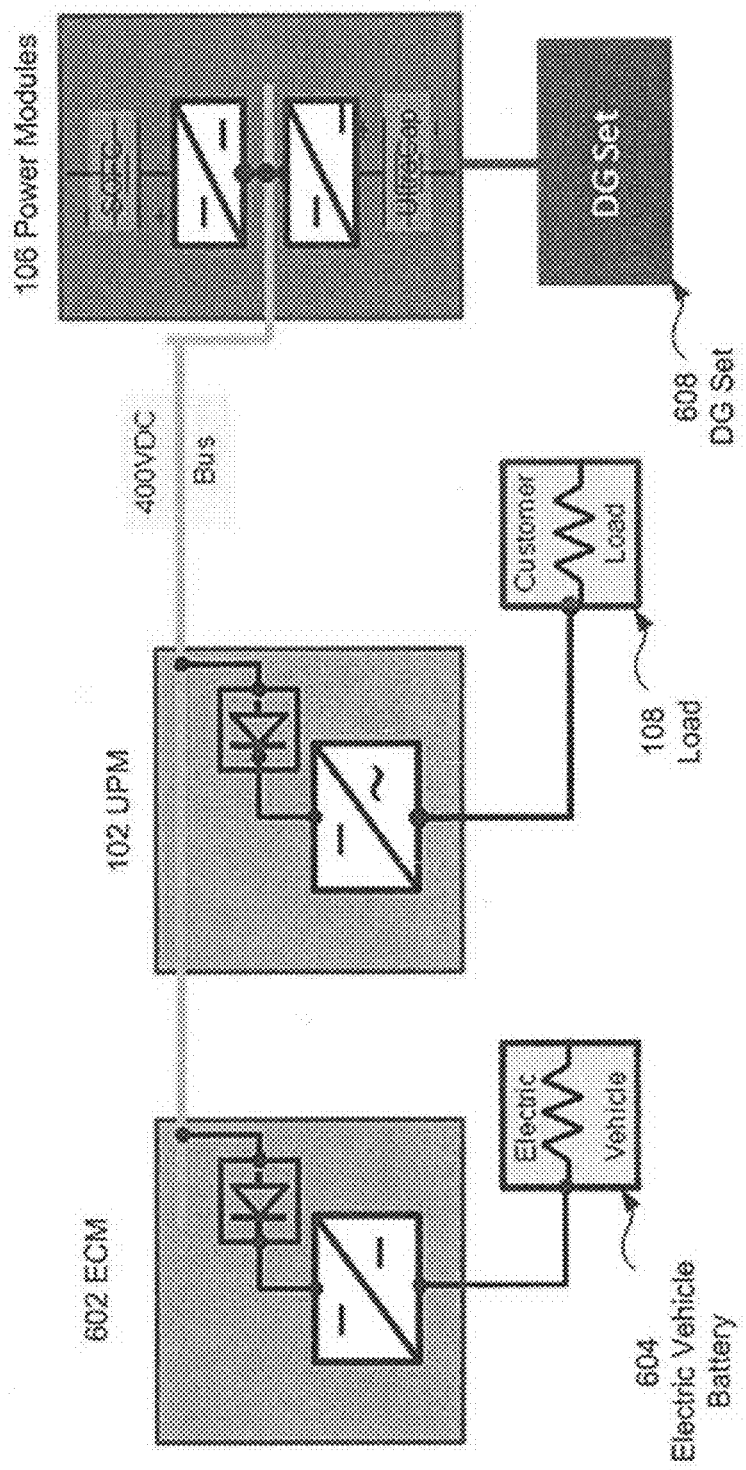

Referring to FIG. 6C an EV charging station comprises one or more power modules 106, a UPM 102, an ECM 602 and a DG set 608. This configuration is suitable for use in remote areas where grid power is not available. In this configuration, the UPM 102 draws power from the DC bus connected to the power modules 106, and feeds the customer load 108. This customer load 108 also acts like a base load to the power modules 106, which allows the system to operate at a certain minimum efficiency (in the configurations illustrated in FIGS. 6A and 6B above, the grid provides the minimum base load for efficient performance). In an embodiment, the power modules 106 and the UPM 102 are rated such that the maximum customer load is always supplied while the ECM 602 is operational. The diesel generator ("DG") set 608 is used to start up the power modules 106.

Figure 6D:
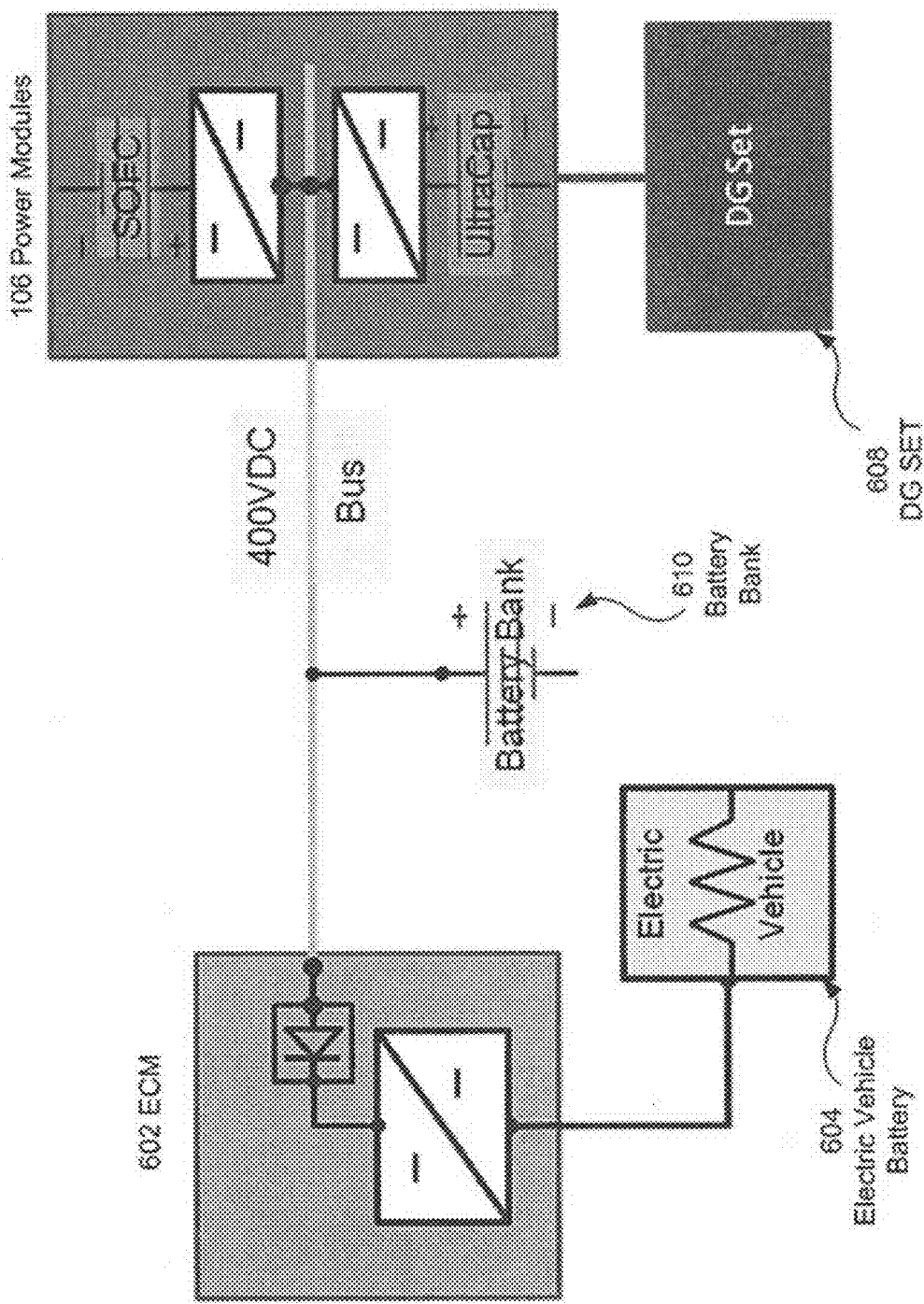

Referring to FIG. 6D, an EV charging station comprises one or more power modules 106 and an ECM 602. This configuration of EV charging stations is suitable for use where there is no grid power and no customer load is to be supplied. The EV charging station is needed only to act as a power source for charging the EV battery 604. In this configuration, a battery bank 610 acts as the base load to the EV charging station. This battery bank 610 may be charged using normal charging (0.1C). An operator of an EV in need of charging the EV battery 604 may obtain a charge from the ECM 602. Alternatively, the operator may exchange a discharged EV battery 604 for one of the batteries in the battery bank 610. The DG 608 set is used to start up the power modules 106.

In an embodiment, the EV charging station is configured to take advantage of time-of-day pricing and to utilize the storage capacity of the EV batteries. For example, the cost of weekday electricity from 11 AM to 9 PM may be several times (e.g., 5 times) higher than the cost of electricity from 9 PM to 11 AM. In this embodiment, DC power is returned from the EV batteries to the fuel cell system to provide power during peak pricing periods and/or to support shortfalls in the power output from the power modules 106 due to an internal power module 106 fault.

Figure 6E:
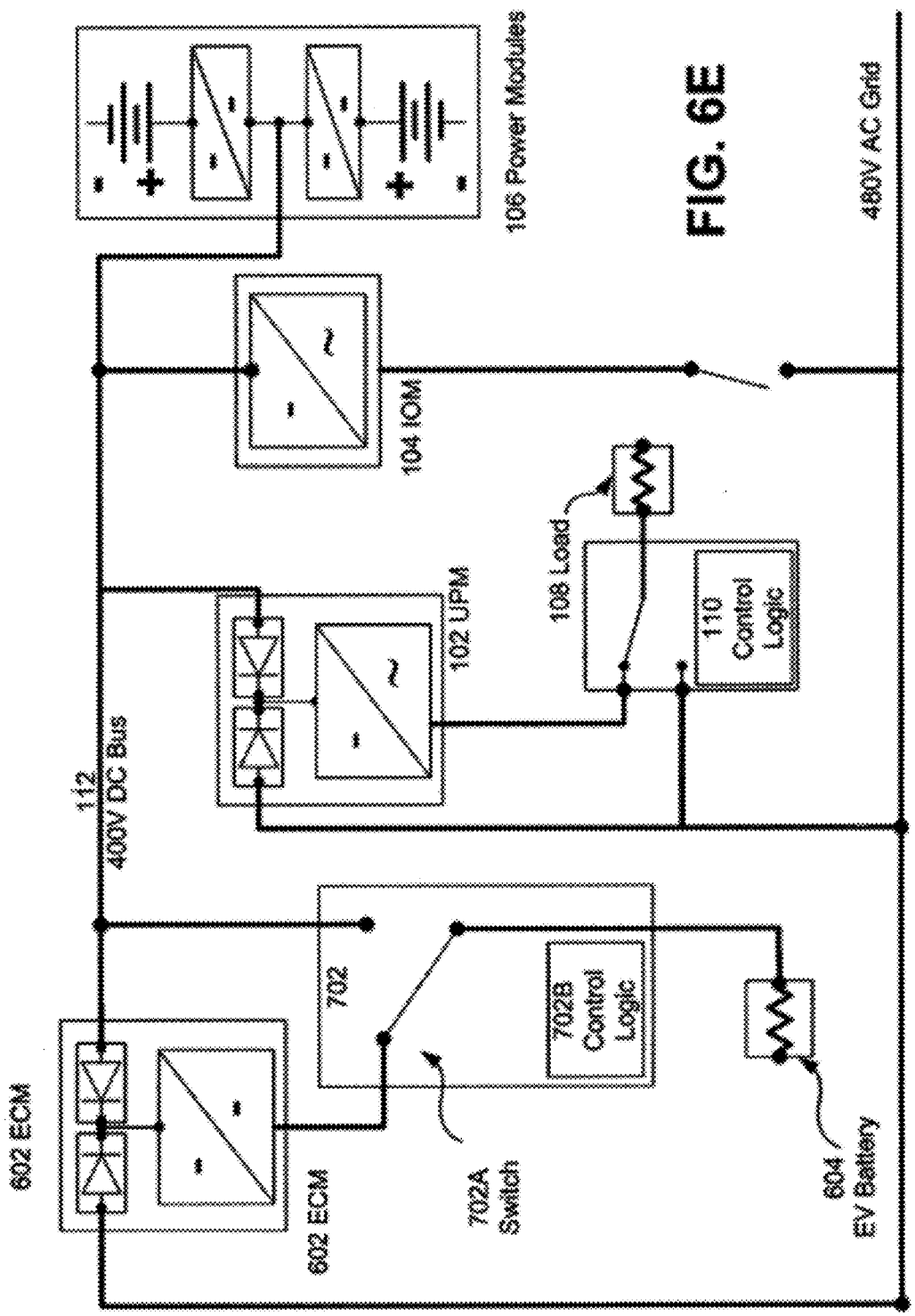

Referring to FIG. 6E, the fuel cell system comprises one or more power modules 106, an IOM 104, a UPM 102, a first control logic unit 110 described above, a switching module 702 containing a switch 702A and second control logic unit 702B, and an ECM 602. If desired, the separate logic units 110 and 702B may be physically combined into a single unit which performs the functions of the unit 110 described above and functions of unit 702B described below. In this embodiment, the power modules 106, IOM 104 and UPM 102 may be used to supply power to a customer load 108 (e.g., a building, such as an office building) while also being able to provide power to the grid, while the ECM 602 may be used for charging an EV battery 604 by drawing power from the 400V DC bus 112. Control logic unit 110 performs the functions as previously described. Control logic unit 702B performs the functions described below. Thus, the UPM 102 and ECM 602 are connected in parallel to the DC bus 112.

In an embodiment, the UPM 102 (e.g., the inverter 102A of UMP 102) is rated higher than required to provide power to load 108 from the power modules 106 alone. The additional power handling capabilities are used to utilize additional DC power from EV batteries that are connected to the EV charging station (i.e., to ECM 602). The control logic unit 702B switches the switch 702A to connect the EV batteries 604 to the ECM 602 receive power from ECM 602, or to DC bus 112 to provide power to the DC bus 112.

By way of illustration and not by way of limitation, the fuel cell system contains power module(s) 106 which are capable of delivering a first value of maximum power (e.g., 200 kW). The UMP 102 is rated to convert DC to AC to provide a second value of maximum power (e.g., 400 kW AC) which is greater than the first value. In other words, the inverter 102A is designed to convert more DC to AC power than the power module(s) are capable of providing. The UMP 102 uses the additional conversion capacity to convert DC power (e.g., up to 200 kW DC) from the EV batteries 604 to AC power to provide to the load 108 or to the grid 114.

Thus, DC power from an electric vehicle battery 604 is received at an electric vehicle charging module (ECM) 602 during a period of higher electricity price from the grid, the received power is provided to the at least one inverter 102A which converts the received DC power to AC power, and provides the AC power to a load (e.g., 108 or grid load 114).

In one embodiment, DC power is provided from the at least one fuel cell power module 106 to the ECM 602, and then provided from the ECM to the electric vehicle battery 604 when the cost of electricity is lower, prior to the step of receiving DC power.

The combination EV charging station and fuel cell system may be located at a business having employees that drive electric cars. Using the time of day pricing set forth above, these employees would generally park their EVs at the business recharging docks and connect the EV batteries 604 to the ECM 602 for 8 to 10 hours during the work day. Typically, all the EV batteries 604 are fully charged (with the switch 702A connecting batteries 604 to ECM 602) before the price of power from the grid increases (e.g., by 11 AM) using the power provided from the ECM 602. Then, after the price of the grid power increases (e.g., after 11 AM), logic 702B switches the switch 702A position to connect the EV batteries 604 to the DC bus 112. The batteries 604 are then used to provide a portion (e.g., 10-75%, for example 50%) of their stored charge to the DC bus 112. For example, the EV batteries may receive more charge each day (or each week etc.) than they provide back to the DC bus. If desired, the owners of the EVs may not be charged for the net charge they received or be charged a reduced rate compared to the rate for charging EV batteries from the grid. The charging station could then deliver up to 400 kW AC to load 108 in a peak-shaving load-following manner. All parties would financially benefit because of the increased price of the mid-day electricity.

In another embodiment, the electric vehicle battery is charged at a location other than the ECM 602 during a lower cost electricity price period prior to the step of receiving DC power from the ECM 602 during the higher cost of electricity price period. For example, EVs are charged at a remote location (e.g., from the grid at home overnight) using lower cost, night time electricity. These EVs may then be connected to the ECM 602 in the morning. After the price of electricity increases mid-day (e.g., after 11 AM) the EV batteries 604 deliver a predetermined portion of their stored charge to the DC bus 112. Thus bus can then deliver up to 400 kW AC to load 108 in a peak-shaving load-following manner. The EV owners may be reimbursed for the cost of provided power (i.e., for the power they stored at their home and delivered to the bus 112). Here again all parties financially benefit because of the higher price of mid-day electricity.

Of course, the times used in the foregoing examples are for illustrative purposes only. The charging station may be configured to utilize power from the EV batteries to address the time-of-day pricing for the region in which the charging station is located.

The above described methods and systems can be readily used with multiple generators in parallel with a large load, while allowing tight control of frequency and voltage.

The following embodiments describe providing a power to a DC or AC load from a first side from distributed fuel cell power generation system described above, and from a grid (e.g., utility or campus grid) or distributed generator (e.g., diesel generator) (DG) from the second side. Each side may be used as the primary or secondary side.

Figure 7A:
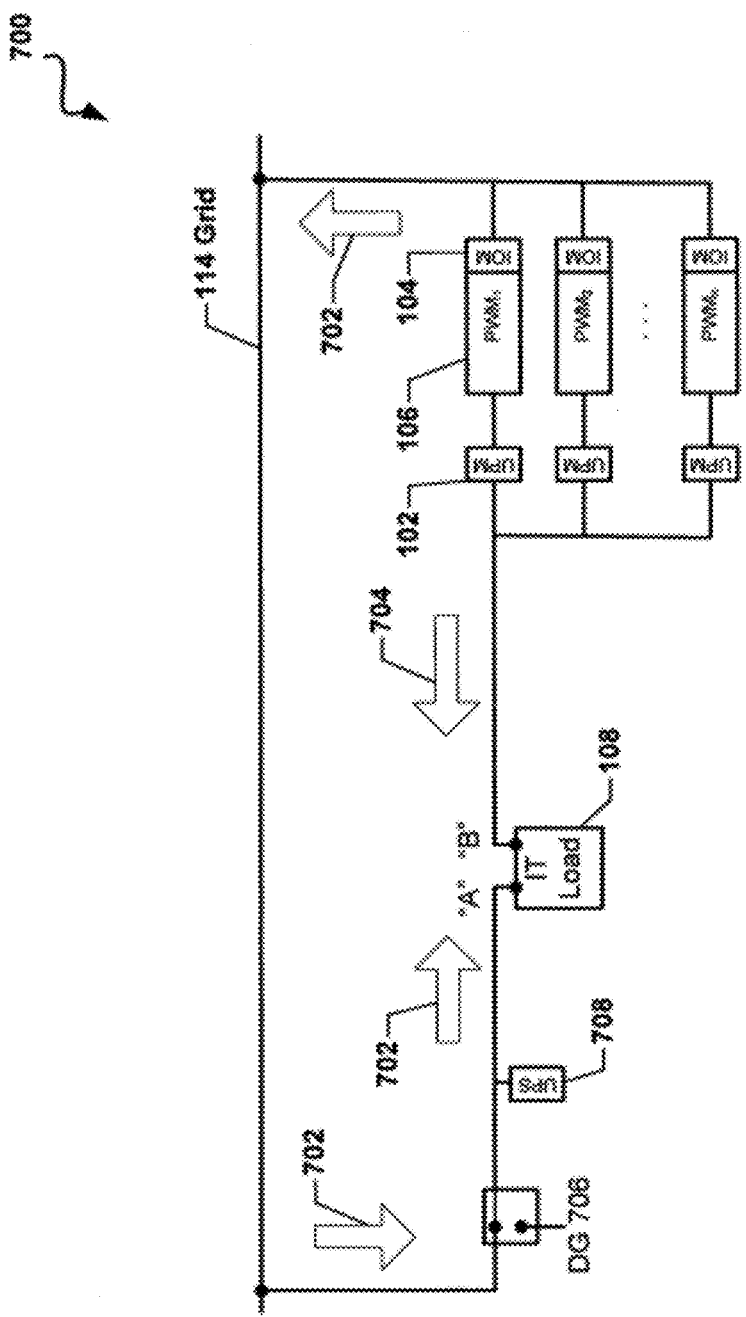
FIG. 7A-B are block diagrams illustrating embodiment systems for powering a data center load having "A" and "B" side feeds.

FIG. 7A illustrates an embodiment system 700 for powering a load 108, which may be an information technology (IT) load, such as a data center IT load (i.e., devices operating in an IT system which may include one or more of computer(s), server(s), router(s), rack(s), power supply connections, and other components found in a data center environment. As described herein, an IT load (i.e., devices operating in an IT system which may include one or more of computer(s), server(s), router(s), rack(s), power supply connections, and other components found in a data center environment) and IT system are distinguished from devices, such as computers, servers, routers, racks, controllers, power supply connections, and other components used to monitor, manage, and/or control the operation of DC power generators and DC power generation systems in that IT loads do not monitor, manage, and/or control the operation of any DC power generators or DC power generation systems that provide power to the IT loads themselves.

The data center housing the IT load may comprise a rack that supports the various servers, routers, etc and/or a building housing the IT load. As shown in FIG. 7A, the data center IT load 108 may be "dual corded" or "multi-corded," meaning the load 108 receives power from multiple power feeds from different sources (e.g., "A" side feed, "B" side feed, "C" side feed, etc.).

As shown in FIG. 7A, the load 108 (e.g., data center rack) may be dual-corded having an "A" side feed and a "B" side feed. The load 108 may draw power from both feeds (e.g., 50% power from the "A" side feed, and 50% power from the "B" side feed). A transfer switch or static switch inside the load 108 may be power seeking and may maintain power to the load 108 (via one or both feeds) under all conditions. In some embodiments, the load 108 may include a dual corded power supply having two sets of AC/DC electronics inside (i.e., an "A" side power supply and a "B" side power supply) which may essentially have a diode—"or" at their output, and power may be drawn from whichever supply is lined up to a viable source. In this type of arrangement, a switch may not be required. The transition from one supply to the other, or power sharing in cases where power is shared between them, may be accomplished using solid state components. Thus, the load comprises a dual corded power supply having two sets of power electronics that may draw power from at least one of the A-side feed and the B-side feed in an auctioneering fashion.

The "A" side feed of the load 108 may be connected to a standard power infrastructure, such as grid 114 power with optional distributed generator (e.g., diesel generator) (DG) 706 and uninterruptable power supply (UPS) 708 backups.

The "B" side feed of load 108 may be connected to one or more UPMs 102 (e.g., stand alone inverter outputs).

The system 700 further includes at least one power module 106 and associated IOM 104. The at least one power module 106 may provide a first portion of its output power (e.g., between 5-95%, such as about 50% of its output power) to the "B" side feed of the load 108 via the one or more UPMs 102. This is illustrated schematically via arrow 704 in FIG. 7A.

The at least one power module 106 may provide a second portion of its output power (e.g., between 5-95%, such as about 50% of its output power) through its associated IOM 104 to the grid 114. The power from the IOM 104 may be provided through the grid 114 to the "A" side feed of the load 108, which as described above, is connected to the grid 114. This is illustrated schematically by arrows 702 in FIG. 7A, which show the power being provided from IOM 104 to the grid 114, and then from the grid 114 through the "A" side feed to the load 108.

In various embodiments, during normal operation of the system 700, the at least one power module 106 may output all or substantially all of the power required by the load 108. A first portion of the power output (e.g., ~50%) may be directly fed to the "B" side feed of the load 108 via UPM 102. A second portion of the power output (e.g., ~50%) may be fed to the grid 114 via IOM 104 and returned from the grid 114 to the "A" side feed of the load 108. Thus, in various embodiments, no net power for the load 108 is required from the grid 114, which may substantially reduce costs for powering a load 108, such as components in a data center rack, since excess power may not need to be purchased from the operator of grid 114. Further, because of the loaded IOM 104 output and the loaded UPM 102 output from power modules 106, the fuel cells in the power modules 106 may be heat-soaked to full or nearly-full load. Therefore, if there is a step in load (e.g., from 50% to 100%) when the "A" (grid) feed is lost, this may be an easy transition that places very little strain on the fuel cells.

In the event of a failure or interruption in the power from the at least one power module 106 (e.g., the load 108 is not receiving power over the "B" side feed), then 100% of the power requirement for the load 108 may be drawn from the grid 114 via the "A" side feed. The resultant spike in grid power demand (e.g., from ~50% to 100% of the load 108 power) may be easily absorbed by the grid 114.

In the event of a failure or interruption in the power from the grid 114, then 100% of the power requirement for the load 108 may be drawn from the at least one power module 106. The power from the at least one power module 106 may be drawn entirely over the "B" side feed from UPM 102, or may be drawn in part through the UPM 102 to the "B" side feed and in part through the IOM 104 and grid 114 connection to the "A" side feed. In various embodiments, during normal operation the at least one power module 106 may output at least about 100% of the power required by the load 108, and thus the at least one power module 106 does not experience a spike in output demand in the event of a grid 114 failure or interruption. Accordingly, harmful spikes in output power demand from the at least one power module 106 may be avoided.

In some embodiments, where the IOM 104 is connected to the grid 114 (which is the "A" side feed of load 108), and the UPM 102 is connected to the "B" side feed of the load 108, the IOM output may be greater than 50% of the output required by the load 108. For example, if the power requirement for the load 108 is 160 kW, the UPM 102 may provide 50% of this power (or 80 kW) to the "B"-side feed. The IOM 104 output may be at least 80 kW, which eliminates all utility (grid) burden from the load 108. However, the IOM 104 may be loaded to greater than 80 kW, such as 120 kW. The excess power (40 kW in this example) may be exported to support other needs (e.g., it may be exported into the data center or building campus load). This type of loading arrangement allows fully covering a critical load 108, such as an IT load, and also allows 100% asset utilization of the distributed power generation (e.g., fuel cell) system. In other words, the "A" side and the "B" side of the power module 106 power output may represent greater than 100% of the load's power requirement, such that at least a part of the module 106 power output is provided to a facility in which the load is located, and the module 106 output power represent approximately 100% asset utilization of the module 106.

It will be understood that the present system 700 is not limited to data centers, and any critical power site which has a multi corded (e.g., A, B, C, etc.) power feed architecture may utilize the present system and method for powering a load.

In various embodiments, the IT load 108 may be an AC load that may receive AC power at the "A" side feed from grid 114. The power generated by the at least one power module 106 may be DC power, and may be converted to AC power prior to being fed to the "B" side feed of the load 108. For example, the system 700 may include an inverter for converting DC to AC power, which may be located in the UPM 102, or at another location between the power module(s) 106 and the "B" side feed to the load 106. In further embodiments, the IT load 108 may be a DC load that receives rectified DC power from grid 114 at the "A" side feed of the load 108 (e.g., an AC/DC rectifier may be provided between the grid 114 and the "A" side feed of load 108). The "B" side feed of the load 108 may be provided with DC power from power module(s) 106 and UPM 102. Optionally, a DC/DC converter may be provided between the power module(s) 106 and the "B" side feed, such as within UPM 102. The DC/DC converter may condition the DC power from power module(s) 106, such as by setting the voltage to a desired point, creating isolation and/or creating the appropriate ground reference, before the DC power is fed to the "B" side feed of load 108. In some embodiments, the load 108 may receive AC power at a first power input (e.g., either the "A" side feed or the "B" side feed in a dual-corded system), and may receive DC power at a second power input (e.g., the other of the "A" side feed and the "B" side feed). The load 108 may include power conditioning components (e.g., inverter(s), rectifier(s), converters, etc.) to condition the input power as needed.

Figure 7B:
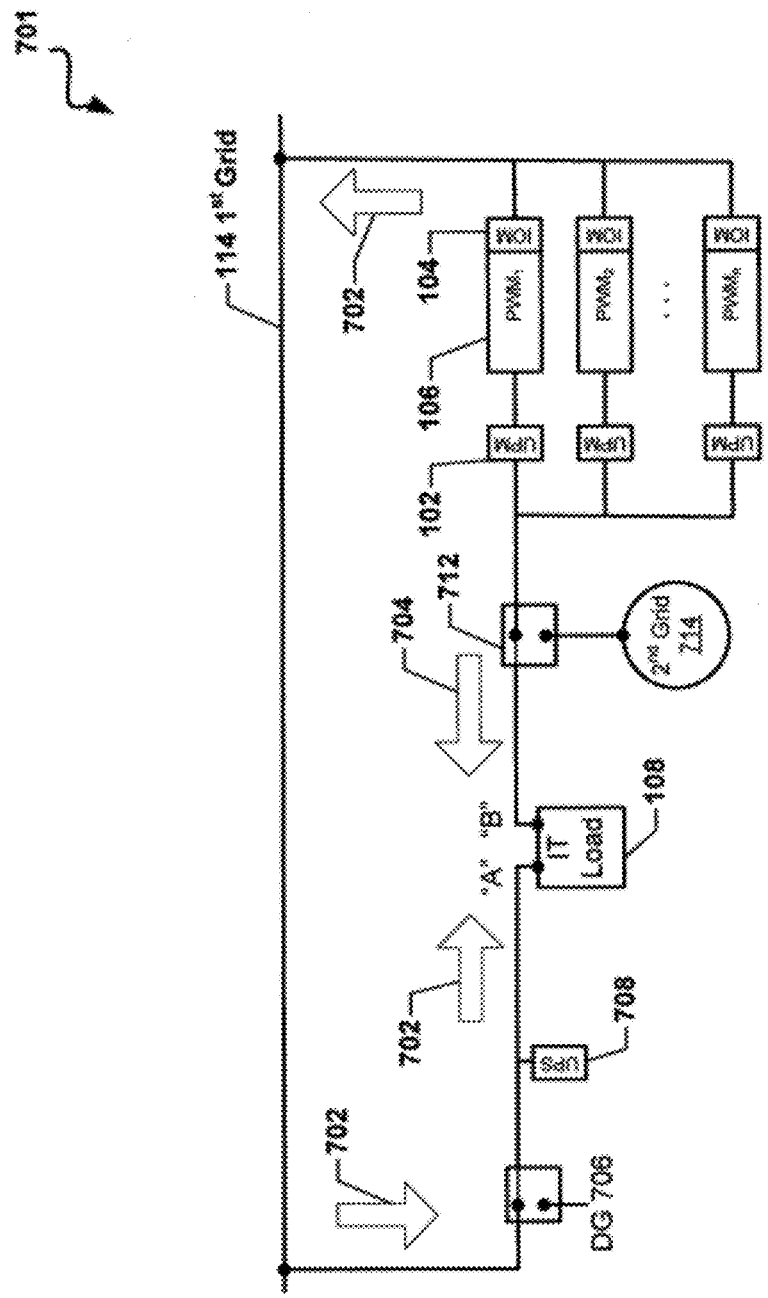

FIG. 7B illustrates an alternative embodiment, in which an additional grid 714 may serve as a supplemental backup to a first grid 114 and the at least one power module 106. As shown in FIG. 7B, a transfer switch 712 may be provided between the output of the at least one UPM 102 and the supplemental grid (e.g., another instance of the first grid feed, or a second grid feed) 714. The output of the transfer switch 712 may be fed as the "B" side feed of the data center load 108. In embodiments, in the event of a failure of the at least one power module 106, the "B" side feed may be provided by the supplemental grid 714.

In alternative embodiments, a power factor correction (PFC) rectifier (e.g., insulated bipolar gate transistor [IGBT] type rectifier) may be utilized as an alternative or in addition to a transfer switch. The feed from the supplemental or $2^{nd}$ grid 714 may be diode-OR'ed with the output from the at least one UPM 102. This may be provided as the "B" side input to the load 108, and static switching may not be required.

Figure 8:
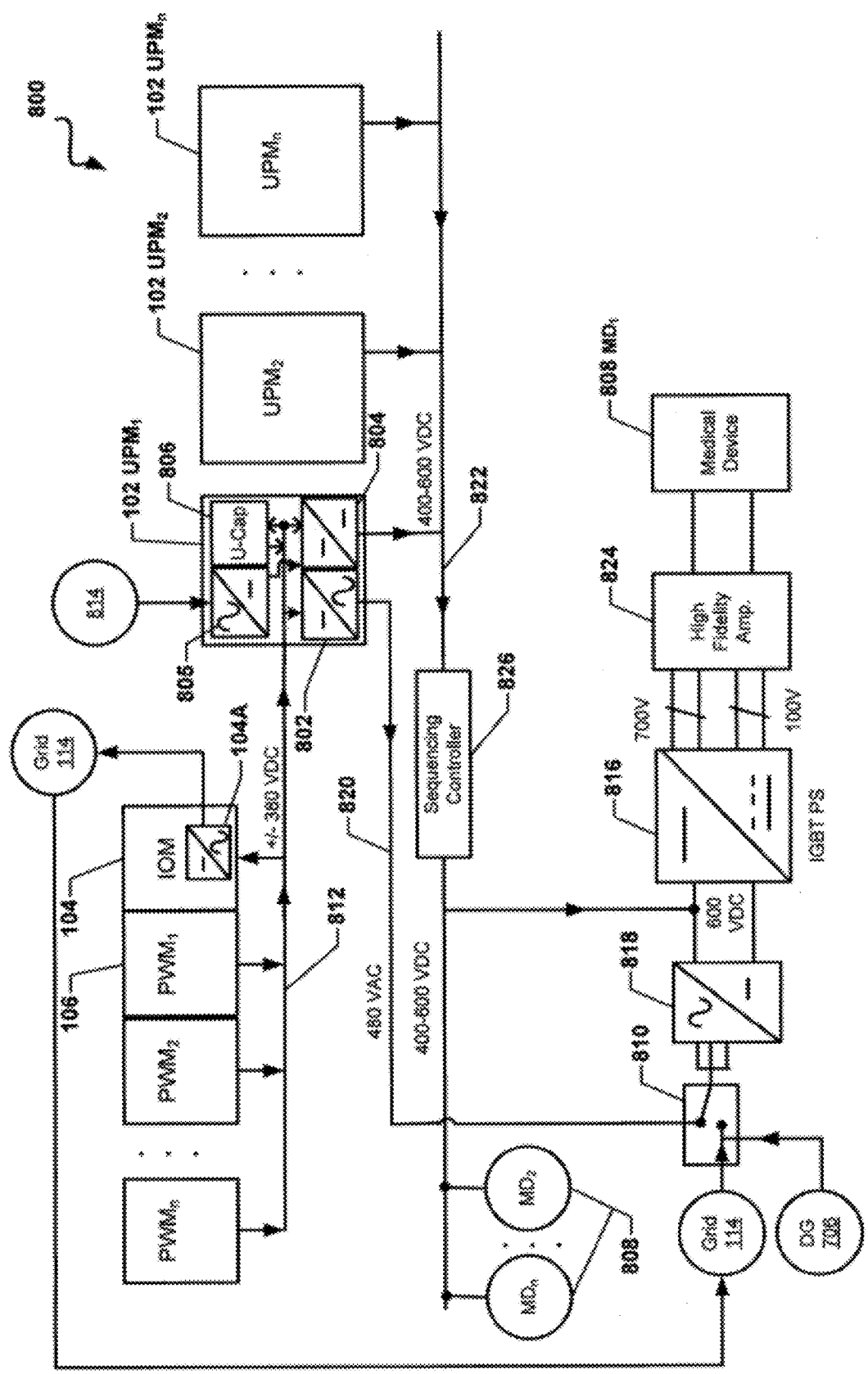
FIG. 8 is a block diagram illustrating an embodiment system for providing power to a medical facility.

FIG. 8 illustrates an embodiment system 800 for providing power to a medical facility. High-power medical devices 808 such as MRI, X-ray, CT scan, Positron Emission Tomography (PET), and X-ray C-Arm devices utilize power supplies which are generally medium voltage AC (such as 480 VAC or 415 VAC) which is rectified to approximately 600 VDC, and then fed to DC/DC converters to create isolated, discrete DC outputs for operation of the hardware. Significant efficiency is lost in the AC/DC conversion stage. Furthermore, medical peaking charges are substantial because of surge power demands.

In the embodiment system 800 shown in FIG. 8, at least one power module 106 and associated IOM 104 may provided with at least one Uninterruptable Power Module (UPM$_1$) 102 paralleled into their DC output bus 812 (e.g., +/−380 VDC bus). This configuration is similar to that shown in FIGS. 6A-6E with respect to the ECM described above, where the output of power modules 106 is provided to bus 812, and the output of bus 812 is provided to IOM 104 and UPM 102. As shown in FIG. 8, additional UPMs 102 (e.g., UPM$_2$, . . . UPM$_n$) may each be similarly connected to additional power module/IOM units (not illustrated). Each UPM 102 may include an inverter 802 that provides an AC power output 820 (e.g., 480 VAC) and a DC/DC converter 804 that provides a DC power output 822 (e.g., 400-600 VDC). The AC output (e.g., 480 VAC) from UPM 102 may be coupled via an AC bus 820 to the input of a medical facility static switch 810 as a "B" side feed. The "A" side feed may be provided from grid 114.

An IOM inverter 104A may output AC power (e.g., 480 VAC) to the grid 114 for general export. As in the embodiment of FIG. 7, the power output to the grid 114 from IOM 104 may be returned at the "A" side feed of the medical facility static switch 810. Thus, in various embodiments, during normal operation of the system 800, no net power may be drawn from the grid 114, and all or substantially all power required by the medical device 808 may be provided by one or more power modules 106.

The power from static switch 810 may be provided as an input to rectifier 818 for converting AC power (e.g., 480 VAC) to DC power (e.g., 600 VDC), which may then be fed to the input stage of medical device DC/DC converter 816. As discussed above, significant efficiency may be lost in this AC/DC conversion process. As shown in FIG. 8, the 400-600 VDC output bus 822 from UPM 102 may also be coupled into the input stage of medical device DC/DC converter 816. Thus, at least a portion of the DC input power to DC/DC converter 816, including all of the DC input power to DC/DC converter 816, may be provided by PWMs 106, via the UPM, without requiring the power to first undergo AC/DC conversion. Thus, at least a portion of the efficiency losses associated with AC/DC conversion may be avoided.

The medical device DC/DC converter 816 may provide a plurality of discrete DC outputs (e.g., 700V, 100V, etc.), which may be fed to high-fidelity amplifier 824, and then used to power one or more medical devices 808 (MD$_1$).

In various embodiments, more than one medical device 808 may be coupled to the DC output of the one or more UPMs 102. As schematically illustrated in FIG. 8, for example, medical devices MD$_2$ through MD$_n$ may be coupled to the 400-600 VDC output bus 822 of UPMs 102, and may be configured similarly to MD$_1$. A sequencing controller 826 may be provided to control the sequence of operation of the medical devices 108. In embodiments, the sequencing controller 826 may be configured to provide small delays such that the power drawn by the medical devices is balanced and excessive peak power draws are not required. In embodiments, the sequencing controller 826 may be configured to prioritize between various pieces of medical equipment. For example, the sequencing controller 826 may provide for emergency status of one or more medical devices such that lower priority devices may be switched off in favor of life-saving critical medical devices.

In various embodiments, the UPMs 102 may include energy storage devices, such as the ultracapacitor 806 shown in FIG. 8. In various embodiments, energy storage with the UPMs 102 may be augmented with additional storage modules in order to provide increased peak power for medical devices without creating increased peaking charges.

In various embodiments, the UPMs 102 may be configured to receive power from a supplemental power source 814, which may be the grid 114, a $2^{nd}$ grid or other AC generator feed to provide backup peaking supply for the UPMs 102. In embodiments, the UPMs 102 may include a PFC corrected rectifier 805 to take in power from supplemental power source 814 on an as-needed basis. Alternatively or in addition, the UPM may include a static switch (not illustrated) to take in a feed from supplemental power source 814, such as a $2^{nd}$ grid, and provide a reliable "B" side feed.

Figure 9:
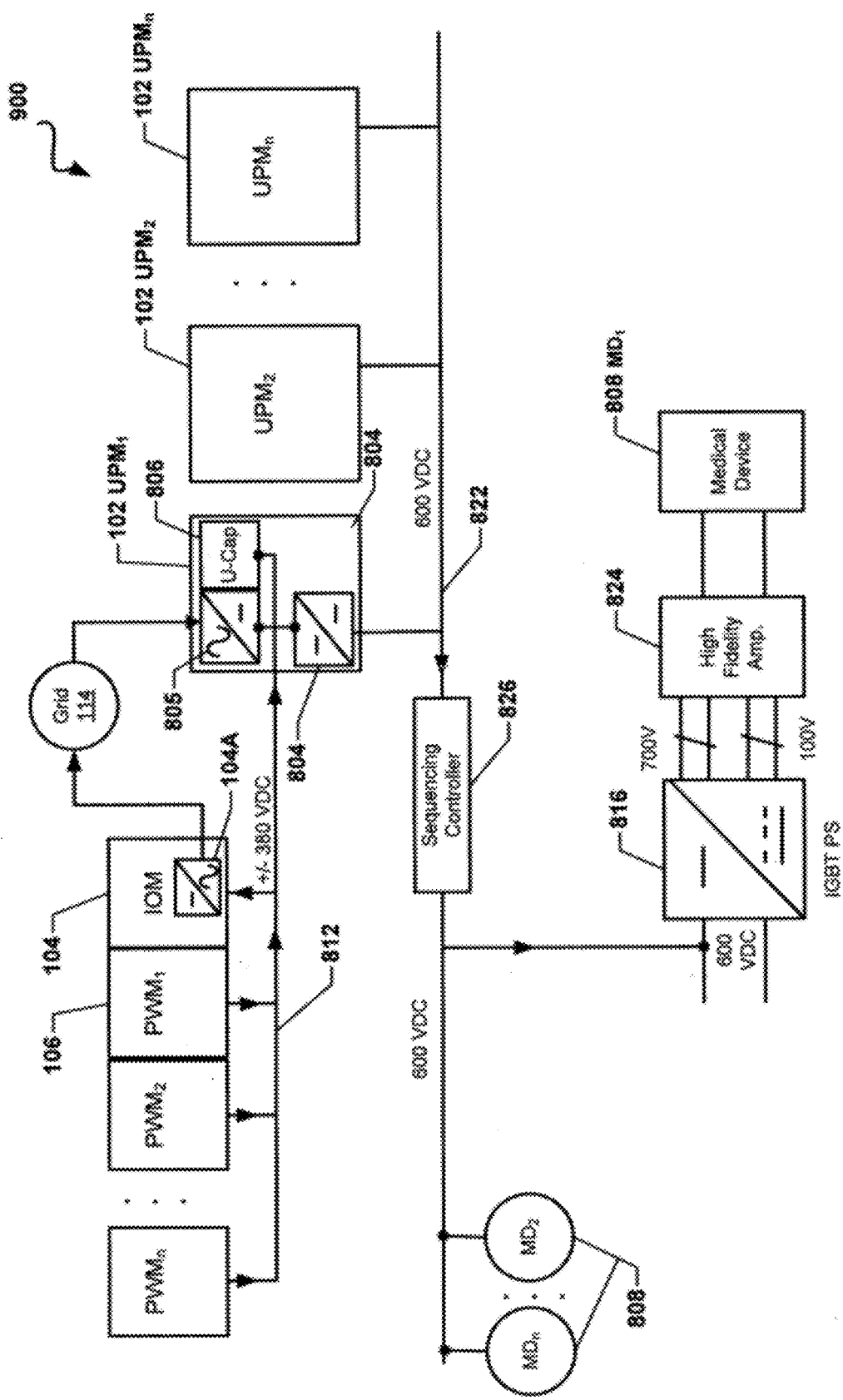
FIG. 9 is a block diagram illustrating a further embodiment system for providing power to a medical facility.

FIG. 9 illustrates a further embodiment system 900 for providing direct DC power to a medical facility. In this system 900, the power modules 106 provide a suitable DC power output (e.g., 600 VDC) to the input stage of the medical device DC/DC converters 816. Multiple power module 106 unit outputs may be paralleled for increased reliability. As shown in FIG. 9, the power modules 106 may be configured to output +/−380 VDC (e.g., using DC/DC converters within the power modules 106), and a second stage of DC/DC converters 802, which may be within the UPMs 102, may produce 600 VDC for a 600 VDC bus 822 (i.e., a "cascaded" approach). In an alternative embodiment, two sets of DC/DC converters may operate in parallel within the power modules 106. A first set of DC/DC converters may produce +/−380 VDC (e.g., for auxiliaries and/or for feed to inverter 104A in IOM 104). A second set of DC/DC converters may produce 600 VDC for the 600 VDC bus 822. In either embodiment, the bus 822 may feed 600 VDC to the input stage of medical device DC/DC converter 816.

As shown in FIG. 9, in embodiments the IOM 104 may include inverter 104A, as described above. The AC power output from the inverter 104A (e.g., 480 VAC) may be provided to the grid 114. The power output to the grid 114 from IOM 104 may be returned to the system 900 at UPM 102, such as via PFC corrected rectifier 805 and/or static switch as discussed above. The grid power may be rectified and DC/DC converted to 600 VDC in UPM 102 and fed to 600 VDC bus 822. Thus, in various embodiments, during normal operation of the system 900, no net power may be drawn from the grid 114, and all or substantially all power required by the medical device 808 may be provided by one or more power modules 106. The power modules 106 may be operated to generate all or substantially all power required by medical devices 108. All or a portion of the output power from power modules 106 may be fed to grid 114 by IOM 104 and returned at UPM 102. All or a portion of the output power from power modules 106 may be DC power that is directly fed to the input stage of medical device DC/DC converter 816. In the event of grid 114 failure or interruption, the system 900 may shift to 100% direct DC power to the medical device. The power modules 106 may not experience any significant power spikes.

Energy storage devices, such as ultracapacitor 806 shown in FIG. 9, may be provided in the UPMs 102 (which may include charger/discharger DC/DC converters, but may not include output inverters in embodiments).

As shown in FIGS. 8 and 9, the UPM 102 according to various embodiments may include an input for receiving DC power (e.g., +/−380 VDC) from one or more power modules 106/IOMs 104, energy storage device(s) 806, such as ultracapacitors or batteries, for energy storage, and may further include charging and discharging (or bi-directional) DC/DC converters for moving energy into and out of energy storage. As shown in FIG. 8, the UPM 102 may also include an inverter 802, which may include inverter and transformer circuitry to generate a suitable AC power feed (e.g., 50/60 Hz 3-wire or 4-wire 480 VAC, or other grid voltages, such as 415 VAC).

In various embodiments, a UPM 102 may also be configured to provide a DC power output at a voltage that is different from the input bus voltage from the one or more power modules 106. As shown in FIGS. 8 and 9, for example, the UPM 102 includes a DC/DC converter 804 that converts the input +/−380 VDC from bus 812 to a different DC output voltage (e.g., 400-600 VDC, such as 600 VDC) on bus 822. Various embodiments may include a UPM 102 that may provide different DC output voltages, including voltages lower than the power module input voltage, such as 12, 24, 36 and/or 48 VDC, as well as adjustable output voltages based on a setpoints, such as 0-600 VDC. In various embodiments, the output DC voltages from UPM 102 which are different from the input voltage provided by power modules 106, may be ungrounded, may be positive with reference to ground, and/or may be negative with reference to ground.

A typical high-power medical device 808, such as an MRI, X-ray, CT scanner, PET scanner, C-arm device, etc., includes a transformer and rectifier input stage in order to generate DC voltages on the order of 600 VDC. Various embodiments may include a medical device 808 that may utilize a direct DC feed, such as shown in FIG. 9. By eliminating the input transformer and rectifier, the efficiency of the device 808 may be increased while lowering the cost of the device 808.

Figure 10A:
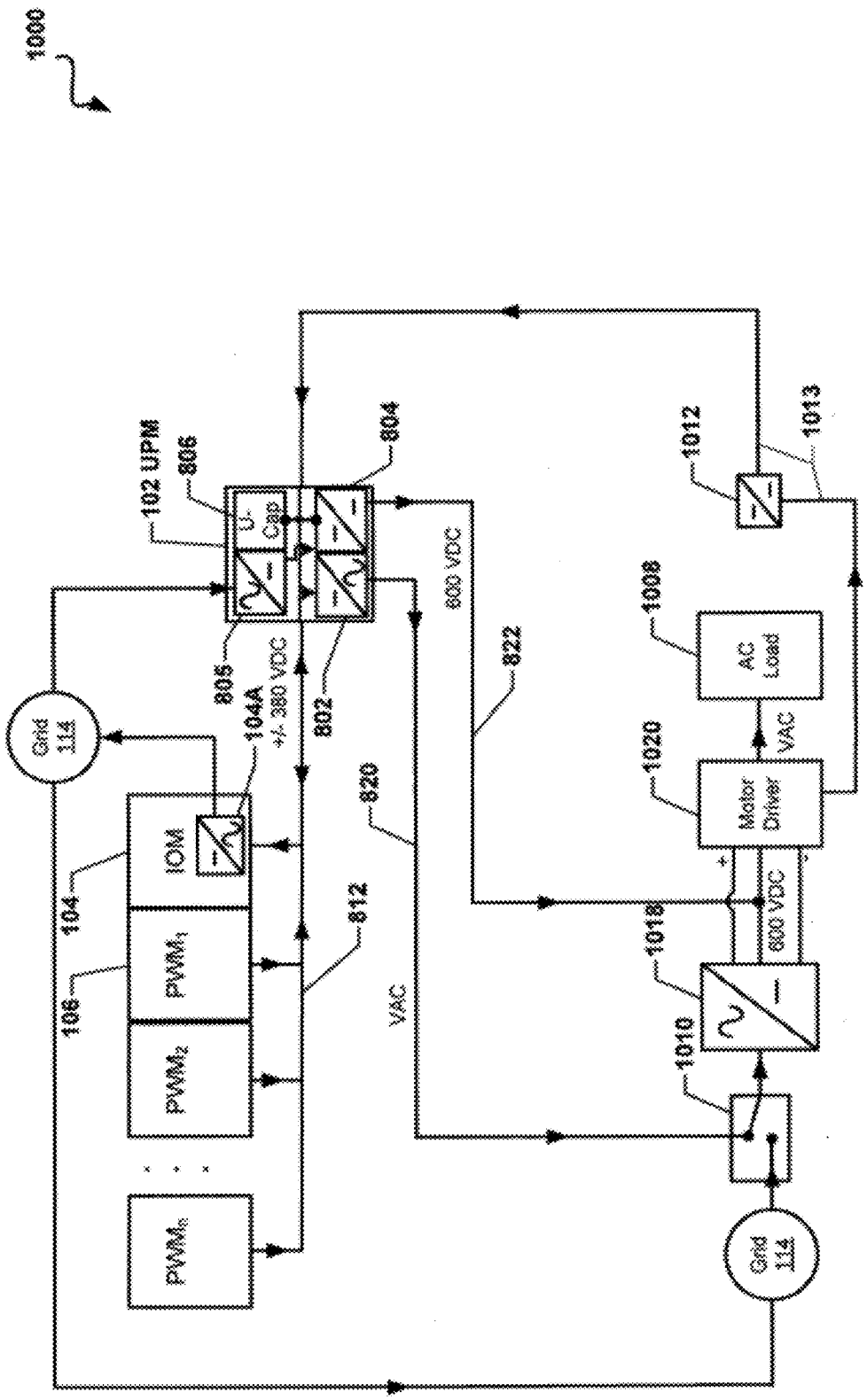
FIGS. 10A-B are block diagrams illustrating embodiment systems for providing a DC power feed to an AC load.
Figure 10B:
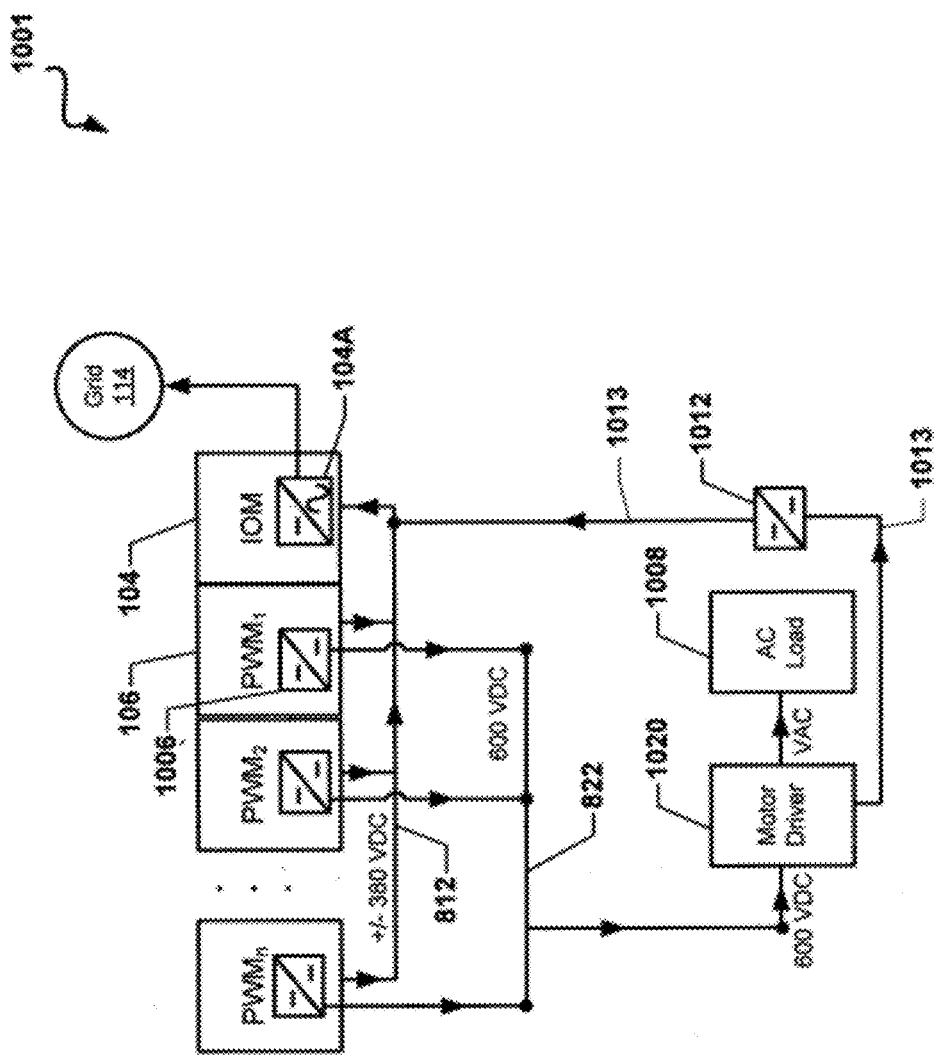

FIGS. 10A-10B illustrate further embodiment systems 1000, 1001 for providing a direct DC power feed to an AC load 1008. Large AC machines are generally powered by a motor driver or load driver or variable frequency drive system that first rectifies a grid feed, and then from that rectified DC feed, generates AC power at the frequency desired for AC load (e.g., motor) operation.

As shown in the system 1000 of FIG. 10A, at least one power module 106 may generate a DC output power (e.g., +/−380 VDC). The DC output power may be coupled to IOM 104 via bus 812. The IOM 104 may include DC/AC converter 104A for exporting output AC power to grid 114. DC bus 812 may also be coupled to UPM 102. UPM 102 may include DC/AC converter 802 for providing an output AC power feed to bus 820 that may be provided as a "B" side feed at transfer switch 1010, which may be a customer-side transfer switch. The "A" side feed of transfer switch 1010 may be from the grid 114. The AC power from transfer switch 1010 may be rectified at AC/DC converter 1018 to provide a DC output power (e.g., 600 VDC) which may be connected as the middle bus of motor driver 1020. Motor driver 1020 may convert the DC power to AC power at a desired frequency for use at AC load 1008.

UPM 102 may include DC/DC converter 804 for providing a DC output power (e.g., 600 VDC) from input DC feed (e.g., +/−380 VDC) from bus 812. The DC output power from UPM 102 may be provided over DC bus 822 (e.g., 600 VDC) to the middle bus of the motor driver 1020.

FIG. 10B illustrates an alternative embodiment system 1001 in which a first DC output power from power module(s) 106 is provided over DC bus 812 (e.g., +/−380 VDC) to IOM 104, where the power may be converted to AC by inverter 104A and exported to grid 114, as in the system 1000 of FIG. 10A. The power module(s) 106 may also include DC/DC converter(s) 1006 that may convert a second portion of the DC output power to a second voltage (e.g., 600 VDC) on bus 822 that may be directly fed to the motor driver 1020 and converted to the desired AC frequency for AC load 1008. The rectifier 1018 for converting AC grid power to a DC feed for motor driver 1020 may not be required in the embodiment of FIG. 10B.

In the systems 1000, 1001 of FIGS. 10A and 10B, a DC/DC converter 1012 (or bi-directional DC/DC converter) may be provided such that motor 1020 braking (or device stopping) current may be placed onto the DC (e.g., +/−380 VDC) bus 812 of the power modules 106 via DC bus 1013 and converter 1012, and thereby may be directed to an energy storage device (such ultracapacitor 806) which may be located in the PWM, the IOM and/or the UPM. The motor braking or device stopping current may also be provided to the grid 114 via the IOM inverter 104A. This is an advantage since a bi-directional motor driver at an energy customer location may utilize braking power, but since the motor driver inverter 1018 would typically not have UL 1741/IEEE 1547 compliance, this power could not be exported into the utility grid and could only be used to supply campus loads on the energy customer side of the meter, and would otherwise have to use resistive loads.

In further embodiments, a configuration such as shown in FIGS. 10A and 10B may be utilized in conjunction with electrically-powered railroad locomotives. One or more distributed power systems, such as systems 1000, 1001 shown in FIGS. 10A and 10B, may be provided on a railway line, such as at one or more railroad stations. Load 1008 may be a locomotive. When the locomotive starts, DC power may be fed to the locomotive directly, such as via DC bus 822 shown in FIGS. 10A and 10B. When the locomotive stops, the braking power may be taken by the system 1001, 1001, such as via DC/DC converter 1012 and DC bus 1013.

The architecture such as shown in FIGS. 10A and 10B may also be used to provide power to DC loads that use a chopper load driver instead of a four-quadrant inverter. Loads of this nature may include induction furnaces, for example. The configuration of FIGS. 10A and 10B may also be used to provide power to X-ray machines used for manufacturing inspection, where the power may be fed to a resonant converter that drives the X-ray machine.

Figure 11:
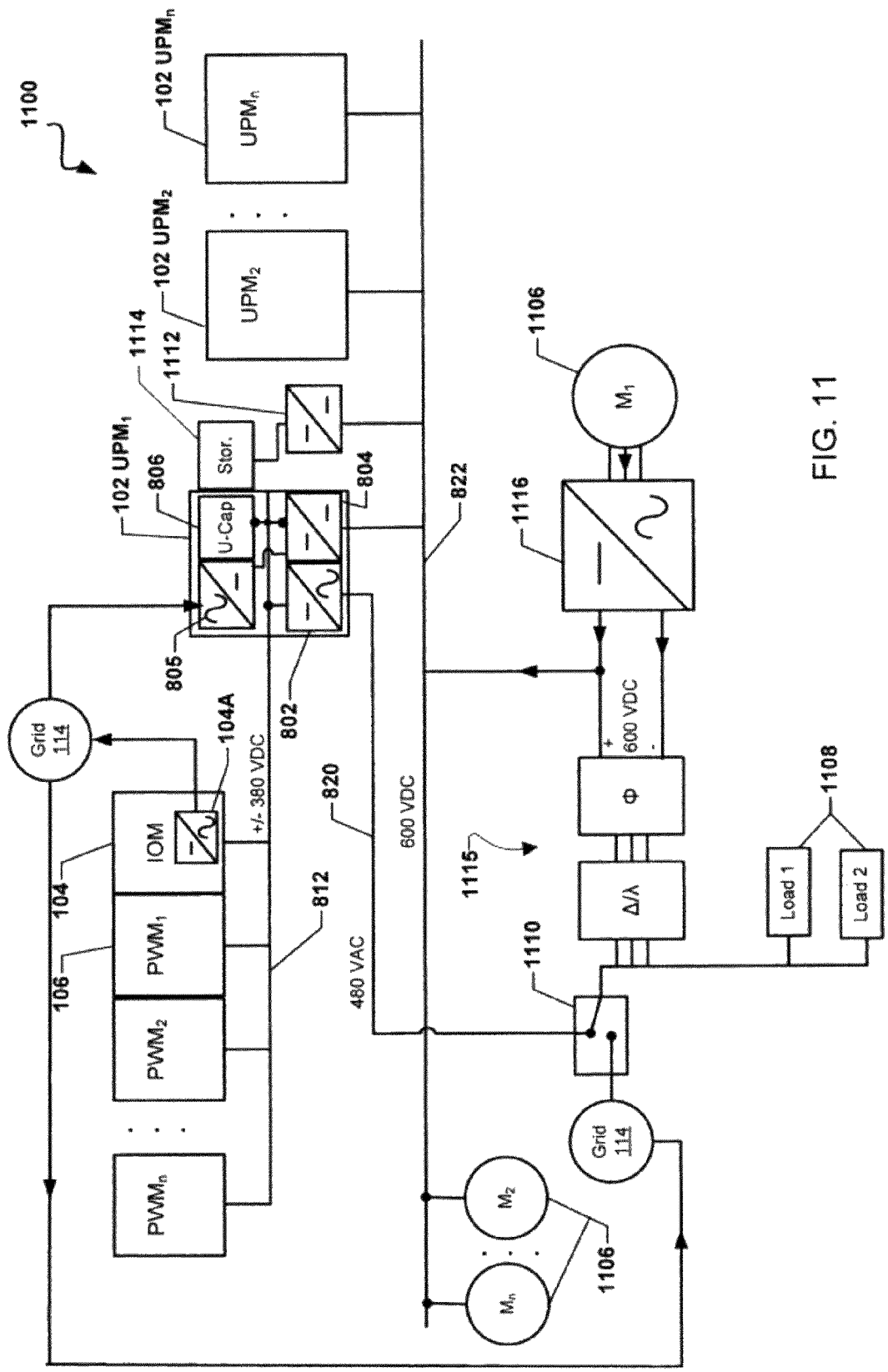
FIG. 11 is a block diagram illustrating an embodiment system for providing power to a load using distributed generator power modules and microturbines.

FIG. 11 illustrates an embodiment system 1100 for powering one or more loads 1108 using one or more power modules 106 and/or one or more microturbine power generators 1106. As shown in FIG. 11, the power from the microturbine ($M_1$) 1106 may be converted to DC power by rectifier 1116, and this DC feed (e.g., 600 VDC) may be provided to DC bus 822, which may be connected to UPM 102. The one or more power modules 106 may be supplemented or replaced by one or more microturbines 1106. Power from microturbine 1106 may be provided to the UPM 102, such as via DC/DC converter 1112 and regenerative storage device 1114 (e.g., storage battery, capacitor, flywheel, etc.), and may be exported to the grid 114 via IOM 104. It will be understood that one or more microturbine generators 1106 may be utilized as an alternative to or in combination with fuel cell power modules 106 in any of the embodiments described above. AC power may be provided to loads 1108 via the grid 114 and/or AC bus 820 from UPM through switch 1110. Additional AC power may be provided to loads 1108 from microturbine 1106 via DC/DC converter 1112 and inverter 1115. A direct DC feed to loads 1108 may be provided from DC bus 822, as described above.

The various embodiments described above may include an on-site fuel storage system. As used herein, "on site" may include within the same building or in the vicinity (e.g., within a 0.1 mile radius) of the distributed generator (e.g., power module 106) and/or the load. In various embodiments, the fuel may include stored compressed natural gas (e.g., in gas storage cylinders or vessels), stored liquid natural gas, stored liquid petroleum, such as propane (e.g., propane tanks), ethanol, diesel, liquid hydrogen, stored compressed hydrogen, and/or ammonia.

In various embodiments, a system for powering one or more loads using distributed power generators, such as fuel cell power modules, microturbines, etc., may include at least two fuel inputs for the distributed power generator(s), where at least one of the fuel inputs comprises fuel from an on-site fuel storage system. In one embodiment, a first fuel input may be fuel supplied from an off-site source (e.g., a natural gas pipeline) and a second fuel input may be an on-site fuel storage system. The system may be configured to shift from the first fuel input to the second fuel input when, for example, delivery of the first fuel input has been interrupted, the first fuel input has a cost that exceeds the second fuel input, and/or there is a predicted interruption in the delivery of the first fuel input (e.g., a natural disaster, such as a tsunami or earthquake) and the second fuel input is hardened to be more survivable in the event of such a disaster.

Various embodiments include a distributed power generation system, comprising at least one power module comprising at least one fuel cell segment generating an output power, a first module comprising at least one power conditioning component electrically coupled between the at least one power module and a grid, and a second module comprising at least one power conditioning component electrically coupled between the at least one power module and a B-side power feed to a load, and wherein the A-side power feed to the load is electrically coupled to the power module via the grid.

In various embodiments, the second module comprises an uninterruptible power module (UPM) that comprises an inverter for providing an AC power output to the B-side feed of the load.

In further embodiments, the UPM comprises a DC/DC converter for converting an input DC power feed from the power module to an output DC power feed on a DC bus.

In further embodiments, the DC bus is electrically coupled to the load to provide a direct DC power feed to the load.

In further embodiments, the uninterruptable power module comprises a rectifier for taking in power from a supplemental power source.

In further embodiments, the supplemental power source comprises a grid.

In further embodiments, the uninterruptable power module comprises an energy storage device.

In further embodiments, the energy storage device comprises an ultracapacitor.

In further embodiments, at least a portion of the power to the load may be provided by a microturbine power generator.

In further embodiments, the system comprises at least two fuel inputs for the at least one fuel cell segment, wherein at least one fuel input comprises a fuel that is stored on-site.

In further embodiments, in response to an expected or actual interruption of the first fuel input or a change in relative price between the first and second fuel inputs, the system is configured to switch from the first fuel input to the second fuel input.

Various embodiments include a distributed power generation system, comprising at least one power module comprising at least one fuel cell segment generating an output power, and at least one uninterruptible power module comprising at least one power conditioning component electrically coupled between the at least one power module and a direct DC power feed to a load, wherein: at least a portion of the output power generated by the at least one power module is provided over an input DC bus at a first voltage to the at least one uninterruptible power module, and is provided from the at least one uninterruptable power module over a DC output bus at a second voltage, different than the first voltage, to the load.

In further embodiments, the at least one power conditioning component comprises a DC/DC converter.

In further embodiments, the second voltage is higher than the first voltage.

In further embodiments, the second voltage is lower than the first voltage.

In further embodiments, the at least one uninterruptable power module is configured to provide an adjustable output voltage over the DC output bus.

In further embodiments, the first voltage is +/−380 VDC and the second voltage is 600 VDC.

In further embodiments, the total output power from the at least one power module comprises at least about 100% of the total power required to power the load.

In further embodiments, substantially no net power is drawn from the grid to provide power to the load.

In further embodiments, at least one uninterruptable power module comprises an inverter for converting at least a portion of the output power generated by the at least one power module to AC power that is provided as a B-side power feed to the load In further embodiments, the A-side power feed to the load is provided by a grid.

In further embodiments, the load comprises at least one of a locomotive, an induction furnace and an x-ray machine used in manufacturing inspection that receives DC power from the DC output bus.

In further embodiments, the system comprises a sequencing controller for controlling the delivery of power over DC output bus to a plurality of loads.

In further embodiments, the sequencing controller is configured to provide delays in the delivery of power to the loads to minimize excessive peak power draws.

In further embodiments, the sequencing controller is configured to control delivery of power to the loads based on a pre-determined priority status of the loads.

Various embodiments include a method of providing power to a load, comprising generating an output power using at least one power module comprising at least one fuel cell segment, providing a first portion of the output power through a grid to an A-side power feed of the load, and providing a second portion of the output power to a B-side power feed to the load.

In further embodiments, the method comprises providing at least one supplemental power supply electrically coupled between the uninterruptible power module and the B-side power feed to the load.

In further embodiments, the supplemental power supply comprises a second grid.

In further embodiments, the method comprises maintaining continuous power to the load over at least one of the A-side and the B-side feeds using a power seeking switch.

In further embodiments, the method comprises converting the first portion of the power output from DC power to AC power using an inverter before providing the power to the grid.

In further embodiments, the method comprises converting at least part of the second portion of the power output from DC power to AC power using an inverter before providing the power to the B-side feed of the load.

In further embodiments, the method comprises converting at least part of the second portion of the power output from DC power at a first voltage to DC power at a second voltage, different from the first voltage, with a DC/DC converter, and providing the DC power at the second voltage to the load.

In further embodiments, the first voltage is +/−380 VDC and the second voltage is 400-600 VDC.

In further embodiments, the method comprises generating power using a microturbine, and providing power from the microturbine to the load.

In further embodiments, the method comprises providing fuel to the fuel cell segment using a first fuel input from a first fuel source, and switching to a second fuel input to the fuel cell segment from a second fuel source, wherein the second fuel source is fuel that is stored on-site.

In further embodiments, the switching is in response to an expected or actual interruption of the first fuel input or a change in relative price between the first and second fuel inputs.

Various embodiments include a method of providing power to a load, comprising generating an output power using at least one power module comprising at least one fuel cell segment, providing a first portion of the output power to a grid, providing a second portion of the output power to a DC/DC converter that converts the output power from a first voltage to a second voltage, and providing the output power at the second voltage to the load.

In further embodiments, the second voltage is higher than the first voltage.

In further embodiments, the second voltage is lower than the first voltage.

In further embodiments, the second voltage is adjustable.

In further embodiments, the first voltage is +/−380 VDC and the second voltage is 600 VDC.

In further embodiments, providing a first portion of the output power to a grid further comprises providing the first portion to an inverter that converts the power from DC power to AC power for export to the grid.

In further embodiments, the total output power from the at least one power module comprises at least about 100% of the total power required to power the load.

In further embodiments, substantially no net power is drawn from the grid to provide power to the load.

In further embodiments, the method comprises providing a third portion of the output power to an inverter that converts the third portion to AC power, and providing the AC-converted third portion of the output power to a B-side power feed of the load.

In further embodiments, the A-side power feed to the load is provided by a grid.

In further embodiments, providing the output power at the second voltage to the load comprises providing the output power at the second voltage as an input to a medical device DC/DC converter for providing a plurality of discrete DC outputs to power at least one medical device.

In further embodiments, providing the output power at the second voltage to the load comprises providing the output power at the second voltage as an input to a motor driver for conversion to a desired AC frequency for at least one AC load.

In further embodiments, providing the output power at the second voltage to the load the load comprises providing the output power at the second voltage to at least one of a locomotive, an induction furnace and an x-ray machine used for manufacturing inspection.

In further embodiments, the method comprises receiving braking current from the load.

In further embodiments, the method comprises providing at least a portion of the power from the braking current to the grid.

In further embodiments, the method comprises storing at least a portion of the power from the braking current in an energy storage device.

In further embodiments, the method comprises controlling the delivery of output power at the second voltage to a plurality of loads.

In further embodiments, controlling the delivery comprises providing delays in the delivery of power to the loads to minimize excessive peak power draws.

In further embodiments, controlling the delivery comprises delivering power to the loads based on a pre-determined priority status of the loads.

In further embodiments, the method comprises generating at least a portion of the power for the load using at least one microturbine power generator.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements (e.g., controller 826) may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

The invention claimed is:

1. A power generation system, comprising:
at least one power module comprising at least one fuel cell segment configured to generate an output power;
at least one first output module comprising at least one power conditioning component electrically coupled between the at least one power module and a grid;
a first bus electrically connecting the grid to an A-side power feed of a load, such that the at least one power module is configured to supply power to the A-side power feed of the load through the at least one first output module; and
at least one second output module comprising at least one power conditioning component electrically coupled between the at least one power module and a B-side power feed of the load;
wherein the load comprises a dual corded power supply having two sets of power electronics that may draw power from at least one of the A-side feed and the B-side feed in an auctioneering fashion.

2. The system of claim 1, wherein:
the load comprises an IT load;
the at least one first output module comprises an input output module;
the at least one second output module comprises at least one uninterruptible power module;
a first portion of the output power generated by the at least one power module is provided through the at least one input output module to the grid, and from the grid to the A-side power feed of the load; and
a second portion of the output power generated by the at least one power module is provided through the at least one uninterruptible power module to the B-side power feed to the load.

3. The system of claim 2, wherein the first portion of the output power comprises about 50% of the total output power from the at least one power module, and wherein the second portion of the output power comprises about 50% of the total output power from the at least one power module.

4. The system of claim 2, wherein the IT load comprises at least one of a computer, server, router, rack, or power supply connection located in a data center.

5. The system of claim 2, further comprising at least one supplemental power supply electrically coupled between the uninterruptible power module and the B-side power feed to the load.

6. The system of claim 5, wherein the supplemental power supply comprises a second grid.

7. The system of claim 5, further comprising a transfer switch positioned between the output of the uninterruptable power module and the supplemental power supply, wherein the output from the transfer switch is provided to the B-side power feed to the load.

8. The system of claim 5, further comprising a power factor correction rectifier positioned between the output of the uninterruptable power module and the supplemental power supply, wherein the output from the power factor correction rectifier is provided to the B-side power feed to the load.

9. The system of claim 8, wherein the power factor correction rectifier is an insulated bipolar gate transistor (IGBT) rectifier.

10. The system of claim 2, wherein the at least one power conditioning component in the at least one input output module comprises an inverter for providing an AC power output to the grid.

11. The system of claim 2, wherein the at least one power conditioning component in the at least one uninterruptable power module comprises an inverter for providing an AC power output to the B-side feed of the load.

12. The system of claim 11, wherein the at least one uninterruptable power module further comprises a DC/DC converter for converting an input DC power feed from the at least one power module to an output DC power feed on a DC bus.

13. The system of claim 12, wherein the voltage of the DC bus is different from the voltage of the input DC power feed from the at least one power module.

14. The system of claim 13, wherein the voltage of the DC bus is 400-600 VDC.

15. The system of claim 12, wherein the at least one uninterruptable power module comprises an energy storage device.

16. The system of claim 1, wherein the total output power from the at least one power module comprises at least 100% of the total power required to power the load.

17. The system of claim 1, wherein substantially no net power is drawn from the grid to provide power to the load.

18. The system of claim 1, further comprising at least one of a diesel generator and an uninterruptable power supply electrically coupled between the grid and the A-side power feed to the load.

19. The system of claim 1, wherein the load comprises a power seeking switch for maintaining continuous power to the load over at least one of the A-side feed and the B-side feed.

20. The system of claim 1, wherein the load comprises one or more medical devices.

21. The system of claim 1, wherein the load comprises one or more AC loads.

22. The system of claim 1, wherein the load comprises at least one of a locomotive, an induction furnace and an x-ray machine for manufacturing inspection.

23. A power generation system, comprising:
at least one power module comprising at least one fuel cell segment generating an output power;
at least one uninterruptible power module comprising at least one DC/AC inverter and at least one DC/DC converter which is electrically coupled between the at least one power module and a direct DC power feed to a load;
a DC input bus electrically connecting the at least one power module and the at least one uninterruptible power module; and
a DC output bus electrically connecting the at least one uninterruptible power module and a load;
wherein:
at least a portion of the output power generated by the at least one power module is provided over the DC input bus at a first voltage to the at least one uninterruptible power module, and is provided from the at least one uninterruptable power module over the DC output bus at a second voltage, different than the first voltage, to the load.

24. The system of claim 23, further comprising:
at least one input output module comprising an inverter electrically coupled to the at least one power module for providing a portion of the output power generated by the at least one power module to a grid;
wherein the at least one uninterruptible power module is configured to receive power from the grid via the DC/AC inverter.

25. The system of claim 23, wherein the load comprises at least one medical device, and the power from the DC output bus is provided as an input to a medical device DC/DC converter for providing a plurality of discrete DC outputs to power at least one medical device.

26. The system of claim 23, wherein the load comprises at least one AC load, and the power from the DC output bus is provided as an input to a motor driver for conversion to a desired AC frequency for the at least one AC load.

27. The system of claim 23, wherein:
the DC input bus is connected to the load such that a braking current from the load is provided to the DC input bus;
at least a portion of the power from the braking current is fed to the grid; and
at least a portion of the power from the braking current is stored in an energy storage device.

28. The system of claim 23, further comprising at least one microturbine power generator electrically coupled to the DC output bus.

29. A method of providing power to a load, comprising:
generating an output power using at least one power module comprising at least one fuel cell segment;
providing a first portion of the output power through a grid to an A-side power feed of the load; and
providing a second portion of the output power to a B-side power feed of the load;
wherein substantially no power spike is experienced by the load when the grid experiences a power outage.

30. The method of claim 29, wherein the load comprises an IT load.

31. The method of claim 29, wherein providing the first portion comprises providing about 50% of the total output power from the at least one power module to the grid, and wherein providing the second portion comprises providing about 50% of the total output power from the at least one power module to the B-side feed.

32. The method of claim 29, wherein generating an output power comprises generating at least 100% of the total power required to power the load.

33. The method of claim 29, wherein power is provided to the load such that substantially no net power is drawn by the load from the grid in addition to the output power supplied by the at least one power module.

34. The method of claim 29, wherein providing the first portion comprises providing the first portion of the output power as DC to an input output module comprising at least one DC/AC inverter and providing conditioned power as AC from the input output module to the grid.

35. The method of claim 29, wherein providing the second portion comprises providing the second portion of the output power as DC to an uninterruptible power module comprising at least one DC/AC inverter and providing conditioned power as AC from the uninterruptible power module to the B-side feed.

36. The method of claim 29, wherein the load comprises one or more DC using medical devices.

37. The method of claim 29, wherein the load comprises one or more AC loads.

38. The method of claim 29, wherein the load comprises at least one of a locomotive, an induction furnace and an x-ray machine for manufacturing inspection.

39. The method of claim 29, wherein:
the first portion of the output power and the second portion of the output power represent greater than 100% of the load's power requirement;
at least a part of the first portion of the output power and the second portion of the output power is provided to a facility in which the load is located; and
the first portion of the output power and the second portion of the output power represent approximately 100% asset utilization of the at least one power module.

40. A power generation system, comprising:
at least one power module comprising at least one fuel cell segment configured to generate an output power;
at least one first output module comprising at least one power conditioning component electrically coupled between the at least one power module and a grid;
a first bus electrically connecting the grid to an A-side power feed of a load, such that the at least one power module is configured to supply power to the A-side power feed of the load through the at least one first output module; and
at least one second output module comprising at least one power conditioning component electrically coupled between the at least one power module and a B-side power feed of the load;
wherein:
the load comprises an IT load;
the at least one first output module comprises an input output module;
the at least one second output module comprises at least one uninterruptible power module;
a first portion of the output power generated by the at least one power module is provided through the at least one input output module to the grid, and from the grid to the A-side power feed of the load; and
a second portion of the output power generated by the at least one power module is provided through the at least one uninterruptible power module to the B-side power feed to the load.

* * * * *